(12) United States Patent
Tanaka et al.

(10) Patent No.: US 9,298,574 B2
(45) Date of Patent: Mar. 29, 2016

(54) DEVICE MANAGEMENT SYSTEM INCLUDING REPORTER SERVER

(75) Inventors: Shun Tanaka, West New York, NJ (US); Tom Haapanen, Pine Brook, NJ (US); Jim Vopni, Pine Brook, NJ (US)

(73) Assignee: RICOH COMPANY, LTD., Tokyo (JP)

( * ) Notice: Subject to any disclaimer, the term of this patent is extended or adjusted under 35 U.S.C. 154(b) by 605 days.

(21) Appl. No.: 13/086,779

(22) Filed: Apr. 14, 2011

(65) Prior Publication Data
US 2012/0266073 A1 Oct. 18, 2012

(51) Int. Cl.
G06F 15/173 (2006.01)
G06F 3/01 (2006.01)
G06F 11/30 (2006.01)
H04L 12/26 (2006.01)

(52) U.S. Cl.
CPC ........ *G06F 11/3013* (2013.01); *G06F 11/3055* (2013.01); *G06F 11/3065* (2013.01); *H04L 43/0817* (2013.01)

(58) Field of Classification Search
CPC ................................ G06F 15/173; G06F 3/01
USPC .......................................... 715/736; 709/223
See application file for complete search history.

(56) References Cited

U.S. PATENT DOCUMENTS

| | | | |
|---|---|---|---|
| 7,047,417 B2* | 5/2006 | Leskuski et al. | 713/182 |
| 8,019,849 B1* | 9/2011 | Lopilato et al. | 709/223 |
| 8,028,331 B2* | 9/2011 | Hermann et al. | 726/7 |
| 8,356,096 B2* | 1/2013 | Gracieux | 709/224 |
| 2003/0033395 A1* | 2/2003 | Sato | 709/223 |
| 2004/0181690 A1* | 9/2004 | Rothermel et al. | 713/201 |
| 2006/0023642 A1* | 2/2006 | Roskowski et al. | 370/254 |
| 2011/0173270 A1 | 7/2011 | Uchida et al. | |

OTHER PUBLICATIONS

U.S. Appl. No. 12/722,367, filed Mar. 11, 2010 of Yuki Uchida et al.
U.S. Appl. No. 12/722,370, filed Mar. 11, 2010 of Yuki Uchida et al.
U.S. Appl. No. 12/722,374, filed Mar. 11, 2010 of Yuki Uchida et al.
U.S. Appl. No. 12/722,376, filed Mar. 11, 2010 of Yuki Uchida et al.
U.S. Appl. No. 12/722,381, filed Mar. 11, 2010 of Yuki Uchida et al.
U.S. Appl. No. 12/958,686, filed Dec. 2, 2010 of Shun Tanaka.
U.S. Appl. No. 13/014,384, filed Jan. 26, 2011 of Shun Tanaka.
U.S. Appl. No. 13/036,455, filed Feb. 28, 2011 of Shun Tanaka.
U.S. Appl. No. 13/036,558, filed Feb. 28, 2011 of Shun Tanaka.
U.S. Appl. No. 13/036,644, filed Feb. 28, 2011 of Shun Tanaka.
U.S. Appl. No. 13/036,745, filed Feb. 28, 2011 of Shun Tanaka et al.
U.S. Appl. No. 13/086,608, filed Apr. 14, 2011 of Shun Tanaka et al.

* cited by examiner

*Primary Examiner* — Tadeese Hailu
*Assistant Examiner* — Darrin Hope
(74) *Attorney, Agent, or Firm* — Cooper & Dunham LLP

(57) ABSTRACT

Apparatuses, systems and methods are provided for managing a plurality of information technology devices in an information technology environment in which the plurality of information technology devices are connected to a network.

18 Claims, 26 Drawing Sheets

Fig. 3A

| DEVICE DATA (Collected by Data Collection Unit 26-1) ||
|:---:|:---:|
| Name of Network Device | Status of Network Device |
| Terminal 25-1 | Maximum storage capacity reached |
| Scanner 25-2 | Ready |

Fig. 3B

| DEVICE DATA (Collected by Data Collection Unit 26-2) ||
|:---:|:---:|
| Name of Network Device | Status of Network Device |
| MFD 25-3 | Ready |
| Printer 25-4 | Out of Paper |

Fig. 4

| PERSISTENT DATA (Maintained by Core Management Unit 27-1) ||| 
|---|---|---|
| Data Collection Unit | Device Data Collected by Data Collection Unit ||
| | Name of Network Device | Status of Network Device |
| Data Collection Unit 26-1 | Terminal 25-1 | Maximum storage capacity reached |
| | Scanner 25-2 | Ready |
| Data Collection Unit 26-2 | MFD 25-3 | Ready |
| | Printer 25-4 | Out of Paper |

Fig. 5

| PERSISTENT DATA (Stored by Device Data Store 28) | | | |
|---|---|---|---|
| Core Management Unit | Data Collection Unit | Device Data | |
| | | Name of Network Device | Status of Network Device |
| Core Management Unit 27-1 | Data Collection Unit 26-1 | Terminal 25-1 | Maximum storage capacity reached |
| | | Scanner 25-2 | Ready |
| | Data Collection Unit 26-2 | MFD 25-3 | Ready |
| | | Printer 25-4 | Out of Paper |
| Core Management Unit 27-2 | Data Collection Unit 26-3 | Device 25-5 | ... |
| | | Device 25-6 | ... |
| | Data Collection Unit 26-4 | Device 25-7 | ... |
| | | Device 25-8 | ... |

Fig. 13

REPORT

Network Device:

MFD 25-3

Device Status:

Ready

CLOSE

Fig. 14

USER INTERFACE SCREEN C

Select Network Device:

MFD 25-3

Specify/Change Configuration:

| | |
|---|---|
| Device Name: | MFD 25-3 |
| IP Address: | 123.99.345.0 |
| Assigned Location: | John Smith's Office |
| Assigned User: | John Smith |
| Firmware Version: | ABC V1.0 |
| Installed Applications: | X1, Y2, Z3 |

SUBMIT

Fig. 16

| SYSTEM CONFIGURATION | | |
|---|---|---|
| Core Management Unit | Data Collection Unit | Network Device |
| Core Management Unit 27-1 | Data Collection Unit 26-1 | Terminal 25-1 |
| | | Scanner 25-2 |
| | Data Collection Unit 26-2 | MFD 25-3 |
| | | Printer 25-4 |
| Core Management Unit 27-2 | Data Collection Unit 26-3 | Device 25-5 |
| | | Device 25-6 |
| | Data Collection Unit 26-4 | Device 25-7 |
| | | Device 25-8 |

Fig. 21

| ACCESS CONTROL LIST | |
|---|---|
| User | Authorized Data |
| John Smith | All |
| Jane Doe | Only device data from Printer 25-4 |
| ... | ... |
| ... | ... |
| ... | ... |

DEVICE MANAGEMENT SYSTEM INCLUDING REPORTER SERVER

TECHNICAL FIELD

This disclosure relates to tools (for example, systems, apparatuses, methodologies, computer program products, etc.) for managing network-connected information technology devices.

BACKGROUND

In the current information age, information technology (IT) tools are extensively used in enterprises and other organizations in order to facilitate processing of documents and data. IT administrators typically have the responsibilities of monitoring and managing IT assets, such as computers, printers, scanners, multi-function devices (MFDs) and other network-connected or standalone devices.

IT management tools (such as a management apparatus and/or management application software) are available to assist IT administrators with performing their duties. For example, FIG. 1 illustrates a system 100, wherein the management apparatus 17 is provided for managing the internal enterprise network 11 and the network devices 15-1 through 15-3 connected to the network 11. The management apparatus 17 may monitor the network, and receive status updates and alert notifications from the network devices 15-1 through 15-3.

There is a drawback, however, in that the number of IT devices connected to a network is generally increasing and, as a result, an IT administrator is required to oversee a growing number of IT assets. Conventional management systems, such as the management apparatus 17 illustrated in FIG. 1, may be ill-equipped to manage a large number of IT devices. For example, a large number of IT devices may lead to a high volume of status updates, alert notifications and other data being transmitted through the network 11, and the management apparatus 17 may not be efficient at handling such data, thereby affecting the ability of the administrator to efficiently manage the IT environment.

Moreover, there is drawback in that data collected from the network environment and from the network devices 15-1 through 15-3 is only stored on the management apparatus 17, or some other internal server connected to the internal enterprise network 11. As such, if a user or member of the enterprise or other organization wishes to access the data collected from the network environment, the user is forced to access the management apparatus via the internal enterprise network 11, and it is difficult for the user to easily access device data from the internet, for example, via a gateway external to the enterprise network 11.

There exists a need for an improved system for managing a plurality of information technology devices connected to a network.

SUMMARY

In an aspect of this disclosure, there is provided a tool (for example, a system, an apparatus, application software, etc.) to an information technology (IT) administrator, to help with management of IT assets in a network environment. Such tool includes various provisions for collecting and reporting device data from a corresponding set or subset of network devices.

For example, in an example in which the tool is embedded within a system, plural data collection units collect device data from respective subsets of network devices, and one or more core management units manage and maintain persistent data (for example, collected device data that is not superseded by later-collected data) collected in the network environment.

Further, there is provided a reporting unit in a system, the reporting unit including a report interface part that operates to receive data access requests from requesting devices, authenticate the data access request, and upon authentication, provide requested data to the requesting device.

In another aspect, the persistent data is stored and maintained in a device data store that can be accessed by any of core management units and the reporting unit. Such aspect allows the reporting unit to access the data independently, even when the core management units is occupied with other management tasks.

In another aspect, a user interface is provided to an external device to allow a user at the external device to modify a configuration of a network device, and a reporting unit communicates with a specific core management unit associated with managing the network device.

In another aspect, a user interface is provided to an external device to allow a user at the external device to select a network device, and a reporting unit communicates with the selected network device to obtain device status information from the selected network device.

In another aspect, a last upload time device data was uploaded is tracked and, at a current upload time, collected device data from the last upload time through the current upload time is uploaded to a device data store.

In another aspect, collected device data is uploaded to a device data store, and then a notification is communicated to the reporting unit to notify the reporting unit that the collected device data has been uploaded to the device data store.

In another aspect, device data collected from a network device from a last upload time through a current upload time is uploaded at a regular interval of time to a device data store.

In another aspect, an external device is authenticated, an authentication token is transmitted to the external device, wherein the token has an associated period of time after which the token expires. The token transmitted to the external device expires if not used within a defined usage period.

In another aspect, a user operating an external device is authenticated, a scope of data to be accessible to the authenticated user is determined, and data access by the user is limited to said scope.

BRIEF DESCRIPTION OF THE DRAWINGS

The aforementioned and other aspects, features and advantages can be more readily understood from the following detailed description with reference to the accompanying drawings wherein:

FIGS. 3A and 3B illustrate examples of device data collected by data collection units, such as data collection units 26-1 and 26-2 depicted in FIG. 2;

FIG. 4 shows an example of a table registering persistent data managed and maintained by a core management unit, such as core management unit 27-1 depicted in FIG. 2;

FIG. 5 shows an example of a table registering persistent data stored in a device data store, such as device data store 28 depicted in FIG. 2;

FIGS. 12-15 illustrate examples of user interface screens provided by a reporting unit, such as reporting unit 290 depicted in FIG. 11, according to exemplary embodiments;

FIG. 16 shows an example of a table registering system configuration information maintained by a reporting unit, such as reporting unit 290 depicted in FIG. 11, according to an exemplary embodiment;

FIG. 21 shows an example of a table registering an access control list maintained by a reporting unit, such as reporting unit 29 illustrated in FIG. 2, according to an exemplary embodiment;

DETAILED DESCRIPTION

Figure 1:
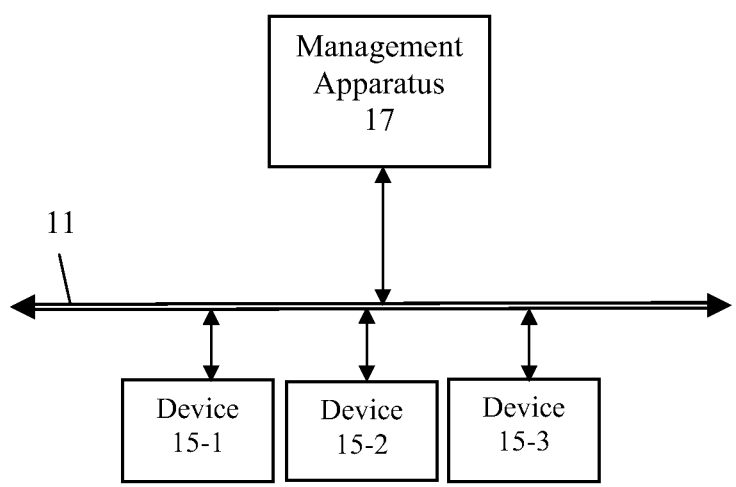
FIG. 1 shows a block diagram of a conventional system.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, there is described tools (systems, apparatuses, methodologies, computer program products, etc.) for managing information technology devices, such as computers, printers, scanners, multi-function devices, and other network-connected, or standalone, devices (such as a projector unit, a video conference device, a telephone conference device, a shredding device, a stamp device, etc.), and for managing one or more networks to which a plurality of such information technology devices are connected.

Figure 2:
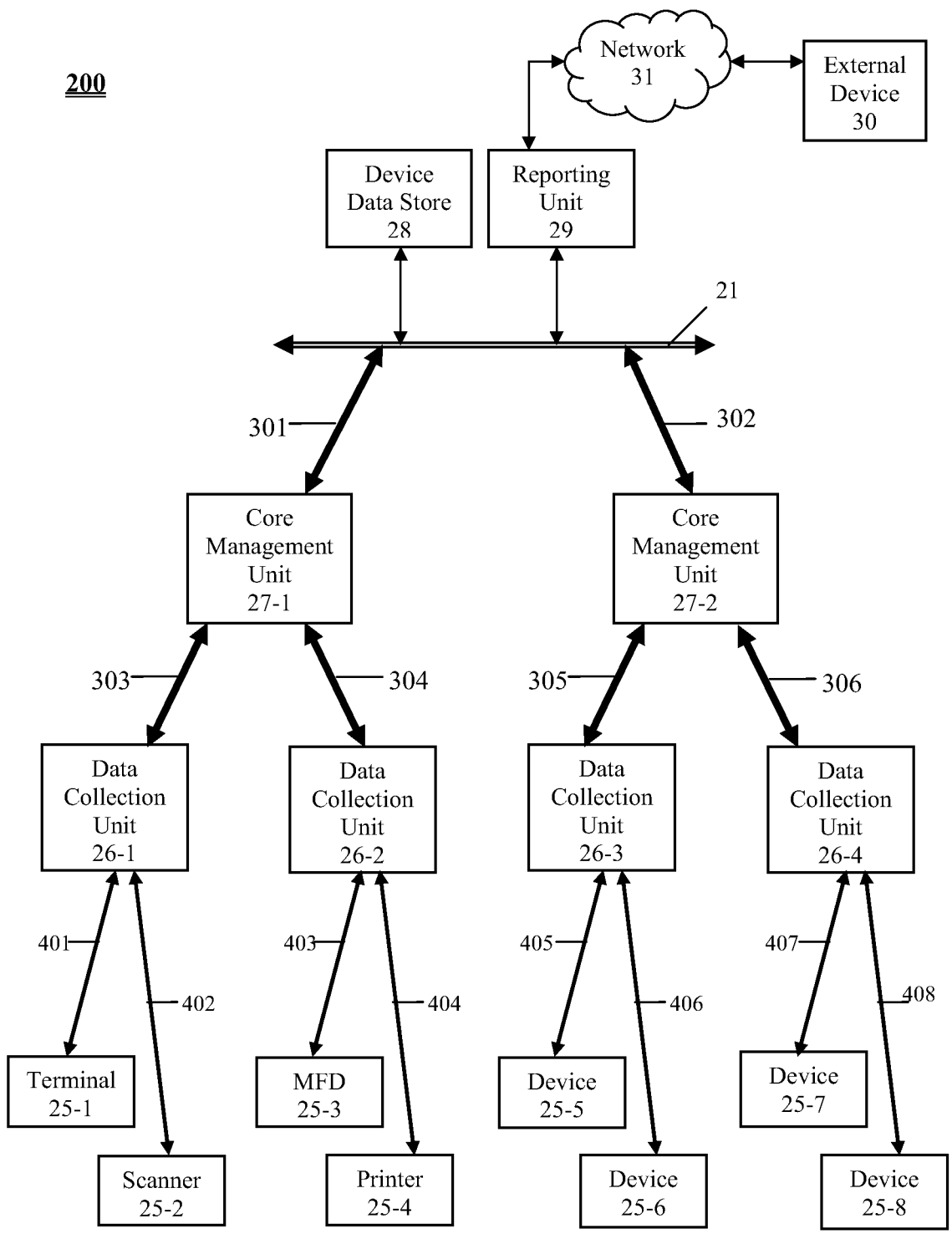
FIG. 2 shows a block diagram of a system, according to an exemplary embodiment.

For example, FIG. 2 shows schematically a system 200 for managing a plurality of devices connected to one or more networks, according to an exemplary embodiment. System 200 includes a plurality of network devices (i.e. network-connected devices) 25-1 through 25-8, one or more data collection units 26-1 through 26-4, and one or more core management units 27-1 and 27-2. The plurality of network devices 25-1 through 25-8 includes, for example, a terminal 25-1, scanner 25-2, multi-function device (MFD) 25-3 and printer 25-4. While the examples of this disclosure will simply refer to network devices 25-1 through 25-8 in the interests of brevity, the aspects of this disclosure are applicable to one or more networks having an arbitrary number of devices 25-1 ... 25-n. System 200 also includes a device data store 28 and reporting unit 29.

As illustrated in FIG. 2, the device data store 28 and reporting unit 29 are connected to the network 21. Core management units 27-1 and 27-2 are connected to network 21 via network connections 301 and 302, respectively. Core management unit 27-1 is interconnected with data collection unit 26-1 via network connection 303, and with data collection unit 26-2 via network connection 304. Core management unit 27-2 is interconnected with data collection unit 26-3 via network connection 305, and with data collection unit 26-4 via network connection 306. The network devices 25-1 and 25-2 are connected to data collection unit 26-1 via network connections 401 and 402, respectively. The network devices 25-3 and 25-4 are connected to data collection unit 26-2 via network connections 403 and 404, respectively. The network devices 25-5 and 25-6 are connected to data collection unit 26-3 via network connections 405 and 406, respectively. The network devices 25-7 and 25-8 are connected to data collection unit 26-4 via network connections 407 and 408, respectively.

The data collection units 26-1 through 26-4 are configured to manage the network devices 25-1 through 25-8 and/or collect device data from the network devices 25-1 through 25-8. In particular, each of the data collection units 26-1 through 26-4 may be responsible for managing and/or collecting device data from a specific plurality or subset of the network devices 25-1 through 25-8. For example, the data collection unit 26-1 collects device data from network devices 25-1 and 25-2, the data collection unit 26-2 collects device data from network devices 25-3 and 25-4, the data collection unit 26-3 collects device data from network devices 25-5 and 25-6, and the data collection unit 26-4 collects device data from network devices 25-7 and 25-8.

An example of device data collected by data collection unit 26-1 from the network devices 25-1 and 25-2 is illustrated in FIG. 3A. As seen in FIG. 3A, the device data for each managed network device may include a name/identifier of the managed device, such as the name 'Terminal 25-1' or 'Scanner 25-2', and a status of the managed device, such as 'Maximum storage capacity reached' or 'Ready'. Similarly, an example of device data collected by data collection unit 26-2 from the network devices 25-3 and 25-4 is illustrated in FIG. 3B. As seen in FIG. 3B, the device data for each managed network device may include a name/identifier of the managed device, such as the name 'MFD 25-3' or 'Printer 25-4', and a status of the managed device, such as 'Ready' or 'Out of Paper'. Likewise, data collection unit 26-3 may collect similar types of device data from devices 25-5 and 25-6, and data collection unit 26-4 may collect similar types of device data from devices 25-7 and 25-8.

The information depicted in FIGS. 3A and 3B is merely exemplary, and other network devices, device status information, device properties, device configuration information, and so forth, may be included in the device data collected by the data collection units. As non-limiting examples, the device data may instead or in addition specify one or more of the following for a given managed network device: device manufacturer; device model; device serial number; device type (printer, scanner, terminal, etc.); device location (physical address, geographic address, network address, IP address, MAC address, etc.); output technology (e.g., laser, inkjet solid ink, thermal, other technology, etc.); device location type (e.g., production/copy center, in a specific workgroup area, etc.); scope (e.g., within the scope of administrative responsibility of a particular IT administrator, outside the scope of administrative responsibility of particular IT administrator, etc.); connection type (e.g., network connected, workstation/local connected, non-connected, etc.); device age (e.g., <1 year, 1-2 years, 2-3 years, 3-4 years, 4-5 years, >5 years, etc.); functions (e.g., copy, fax, print, scan, copy/scan, copy/fax, copy/print, print/fax, print/scan, copy/print/fax, copy/print/scan, copy/print/fax/scan, etc.); firmware version (e.g., major version, minor version, etc.); installed applications (e.g., application name, major version, etc.); organization (e.g., different groups, sub-groups, levels, departments, divisions and so forth within a larger enterprise or institutional entity, such as management group, sales group, marketing group, research & development group, etc.); supply level (e.g., consumable types such as paper and toner >empty/low/ok, etc.); capability (e.g., color, economy color, monochrome only, color scan, duplex, A3, not A3, etc.); last status update (e.g., 10 minutes, 60 minutes, 6 hours, etc.); duplex usage (e.g., 2:1, 1:2, 2:2, Book Duplex, etc.); paper size usage (e.g., A3, A4, B4, etc.); pages per job (e.g., 1, 2, 6-10, etc.); pages per minute (PPM) range (e.g., 1-20 ppm, 41+ ppm, etc.); color technology (e.g., professional color, convenience color, etc.); audit results/analysis (e.g., devices which satisfied a particular audit or test, devices which did not satisfy a particular audit or test, etc.); and so forth.

The device data stored by the data collection units 26-1 through 26-4 may also include error history information that includes a log of all errors occurring at the corresponding managed device, and usage history information indicating which users have the utilized the managed device and when such use has occurred. The usage history information may indicate, for example, a number of total impressions (e.g. pages) produced by a user, or a number of specific types of impressions (copy color, copy BW, print color, print BW, etc.) produced by a user.

Figure 6:
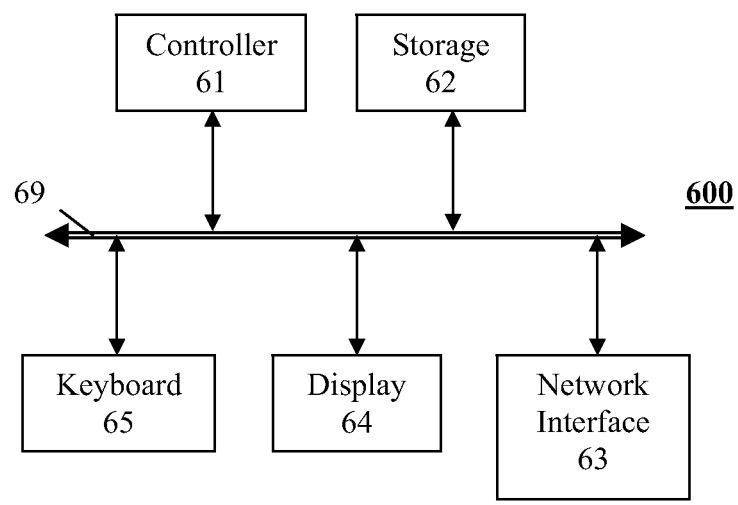
FIG. 6 shows a block diagram of an exemplary configuration of a computer that can be used to implement a reporting unit, such as reporting unit 29 as illustrated in FIG. 2.

Each of the data collection units 26-1 through 26-4 may include a communication part configured to communicate with one or more of the plurality of network devices 25-1 through 25-8 to collect and obtain the various device data corresponding to each device. (For example, FIG. 6 shows an exemplary constitution of a computer that may be used to implement a data collection unit that includes network interface 63). Many printers and other devices store data indicating their attributes or properties in a Management Information Base (MIB). The MIB may conform with the SNMP (Simple Network Management Protocol) protocol, and properties information can be obtained directly from the MIB through SNMP queries. In this way, the data collection units are configured to discover and/or poll the corresponding plurality of network devices to obtain the device data from the network devices.

Each of the data collection units 26-1 through 26-4 may obtain the device data (such as the name, status, configuration information, error history, usage history, etc.) from each network device by monitoring the corresponding network connections, and detecting and receiving one or more alert notifications or status updates transmitted through the network connections from any of the plurality of network devices 25-1 through 25-8. For example, each of the data collection units 26-1 through 26-4 may receive the status updates by repeatedly transmitting requests (via a communication part) to the network devices 25-1 through 25-8 via the corresponding network connections, inquiring as to the status of each network device. In response, each network device may transmit status updates back to the data collection units 26-1 through 26-4, wherein each status update indicates the device name, status, configuration information, error history, usage history, whether an error exists or has occurred at the network device, etc. Alternatively, each network device 25-1 through 25-8 may automatically transmit status updates to the data collection units 26-1 through 26-4 (without waiting for requests or queries from the data collection units 26-1 through 26-4), at regular intervals or whenever an error occurs at the network device. Each data collection unit may include locally resident hardware and/or software agents installed locally on each of the network devices 25-1 through 25-8, which are configured to transmit the status updates directly to a communication part of each data collection unit. The device data may be stored along with other data in a storage part of each data collection unit. (For example, FIG. 6 shows an exemplary constitution of a computer that may be used to implement a data collection unit that includes storage part 62). Alternatively, the device information can be stored externally to each data collection unit and retrieved (for example, through a network) as needed.

Each of the core management units 27-1 and 27-2 illustrated in FIG. 2 manages and maintains persistent data collected in the network environment, the persistent data including the device data collected by the data collection units 26-1 through 26-4 from the network device 25-1 through 25-8. In particular, each of the core management units 27-1 and 27-2 may be responsible for managing and/or collecting device data from a specific plurality or subset of the data collection units 26-1 through 26-4. For example, the core management unit 27-1 may obtain persistent data from data collection units 26-1 and 26-2, and the persistent data may include the device data collected by the data collection units 26-1 and 26-2 from the network devices 25-1 through 25-4. As another example, the core management unit 27-2 may obtain persistent data from data collection units 26-3 and 26-4, and the persistent data may include the device data collected by the data collection units 26-3 and 26-4 from the network devices 25-5 through 25-8.

FIG. 4 illustrates an example of persistent data managed and maintained by the core management unit 27-1, the persistent data being obtained from the data collection units 26-1 and 26-2 and including the device data collected by the data collection units 26-1 and 26-2 from the network devices 25-1 through 25-4. As seen in FIG. 4, the persistent data indicates, for each data collection unit 26-1 and 26-2, the device data (including, for example, a name of managed device and a status of managed device) collected by that data collection unit from the network devices managed by that data collection unit. That is, the persistent data of FIG. 4 indicates the device data collected by data collection unit 26-1 from the network devices 25-1 and 25-2 managed by the data collection unit 26-1, and indicates the device data collected by data collection unit 26-2 from the network devices 25-3 and 25-4 managed by the data collection unit 26-2. Thus, the device data indicated in the persistent data of FIG. 4 matches the device data collected by the data collection units 26-1 and 26-2 as illustrated in FIGS. 3A and 3B. The persistent data may be stored in, for example, a storage part of the core management unit 27-1. In a similar manner, core management unit 27-2 may maintain and manage persistent data obtained from the data collection units 26-3 and 26-4, where the persistent data includes the device data collected by the data collection units 26-3 and 26-4 from the network devices 25-5 through 25-8.

The information depicted in FIG. 4 is merely exemplary, and other device data, device status information, device properties, device configuration information, and so forth, may be included in the persistent data collected from the network environment and maintained and managed by the core management unit. As non-limiting examples, the persistent data may instead or in addition include one or more of the following for a given managed network device: device manufacturer; device model; device serial number; device type (printer, scanner, terminal, etc.); device location (physical address, geographic address, network address, IP address, MAC address, etc.); output technology (e.g., laser, inkjet solid ink, thermal, other technology, etc.); device location type (e.g., production/copy center, in a specific workgroup area, etc.); scope (e.g., within the scope of administrative responsibility of a particular IT administrator, outside the scope of administrative responsibility of particular IT administrator, etc.); connection type (e.g., network connected, workstation/local connected, non-connected, etc.); device age (e.g., <1 year, 1-2 years, 2-3 years, 3-4 years, 4-5 years, >5 years, etc.); functions (e.g., copy, fax, print, scan, copy/scan, copy/fax, copy/print, print/fax, print/scan, copy/print/fax, copy/print/scan, copy/print/fax/scan, etc.); firmware version (e.g., major version, minor version, etc.); installed applications (e.g., application name, major version, etc.); organization (e.g., different groups, sub-groups, levels, departments, divisions and so forth within a larger enterprise or institutional entity, such as management group, sales group, marketing group, research & development group, etc.); supply level (e.g., consumable types such as paper and toner >empty/low/ok, etc.); capability (e.g., color, economy color, monochrome only, color scan, duplex, A3, not A3, etc.); last status update (e.g., 10 minutes, 60 minutes, 6 hours, etc.); duplex usage (e.g., 2:1, 1:2, 2:2, Book Duplex, etc.); paper size usage (e.g., A3, A4, B4, etc.); pages per job (e.g., 1, 2, 6-10, etc.); pages per minute (PPM) range (e.g., 1-20 ppm, 41+ ppm, etc.); color technology (e.g., professional color, convenience color, etc.); audit results/analysis (e.g., devices which satisfied a particular audit or test, devices which did not satisfy a particular audit or test, etc.); and so forth.

Each of the core management units 27-1 and 27-2 is also configured to store the persistent data (obtained from the respective data collection units associated with that core management unit) in the device data store 28. Thus, the device data store 28 may stored all the persistent device data obtained from the data collection units 26-1 through 26-4 and collected from network devices 25-1 through 25-8.

FIG. 5 illustrates an example of persistent data stored in the device data store 28, the persistent data being uploaded from the core management units 27-1 and 27-2 (and including the device data collected by the data collection units 26-1 through 26-4 from the network devices 25-1 through 25-8). As seen in FIG. 5, the persistent data indicates, for each core management unit 27-1 and 27-2, the corresponding data collection units associated with the core management unit. The persistent data also indicates, for each data collection unit 26-1 through 26-4, the device data (including, for example, a name of managed device and a status of managed device) collected by that data collection unit from the network devices managed by that data collection unit. For example, the persistent data of FIG. 5 indicates the device data collected by data collection unit 26-1 from the network devices 25-1 and 25-2 and which is transmitted to the core management unit 27-1.

Each core management unit or reporting unit may utilize the persistent data collected from the network to generate various device alert notifications for transmission to a predetermined destination (e.g. a website or an email address of an administrator) or for display, such as on a user interface screen of the core management unit 27 or reporting unit 29. The device alert notifications may include a status change alert (e.g. the device status of a particular network device 25-1 through 25-8 has changed from a first value to a second value), a sustained status alert (e.g. the device status of a particular network device 25-1 through 25-8 has remained the same for a specified period of time), and a recurring status alert (a particular status/condition has occurred a predetermined number of times at particular network device within a specified period of time).

The reporting unit 29 is configured to receive a data access request from an external device external to the network environment. For example, as seen in FIG. 2, the reporting unit 29 may communicate with external device 30 and receive a data access request from external device 30 via network 31, which may be, for example, the internet. The reporting unit 29 is also configured to authenticate the data access request from the external device 30 (or alternatively authenticate the external device 30 itself or a user of the external device 30). Upon successful authentication, the reporting unit 29 is configured to obtain the data requested in the data access request from the device data store 28, and provide the requested data to the external device 30, in response to the data access request from the external device. For example, if the data access request includes a request for the device data of MFD 25-3, then the reporting unit 29 is configured to obtain the device data of MFD 25-3 from the persistent data stored in device data store 28 (as seen in FIG. 5), and provide the requested data to the external device 30.

Thus, in this exemplary embodiment there is provided a core management unit for managing one or more data collection units, and each of the data collection units manages a number of network devices. Device data collected by each of the data collection units from the network devices is provided to the core management units, and is then stored in a device data store. Thus, a large number of network devices may be managed by a plurality of data collection units, which are themselves managed by the core management unit.

Moreover, a reporting server that is separate from any core management units is provided. The reporting server may Or may not be provided outside the internal enterprise/organization networks. The reporting server may be accessible by a client or customer via the internet, for example, and may provide various information (including persistent data collected from network devices) in a specific reporting format for reporting to the client or customer, in response to a client data request. By providing the dedicated reporting server that is separate from the core management units, the client or customer may more easily access the persistent data from an external location, without having to negotiate directly with the core management units and/or other the internal servers. Moreover, the functionality of the dedicated reporting server (e.g. reporting rules, reporting format, etc.) may be specifically customized to control the reporting of information to the client or customer.

The core management unit, data collection unit and/or reporting unit of this disclosure may be realized by a computer program product including a computer-usable, non-transient medium (such as a disk storage apparatus) having instructions tangibly embodied therein that are executed by a computer. Thus, it should be understood that the core management unit, data collection unit and/or reporting unit may be executed on a computer. While the core management unit, data collection unit and/or reporting units are shown as being external to the network devices, the core management unit, data collection unit and/or reporting unit may in fact be executed on a client terminal and/or network-connected device. Each of the core management unit, data collection unit, reporting unit and device data store may in fact be executed on another one of the aforementioned devices.

The core management unit, data collection unit and reporting unit may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

Each of the network connections 31, 301-306 and 401-408 may be provided via one or more of a secure intranet or extranet local area network, a wide area network (WAN), any type of network that allows secure access, etc., or a combination thereof. Further, other secure communications links (such as a virtual private network, a wireless link, etc.) may be used as well as the network connections. In addition, the network connections may use TCP/IP (Transmission Control Protocol/Internet Protocol), but other protocols such as SNMP (Simple Network Management Protocol) and HTTP (Hypertext Transfer Protocol) can also be used. How devices can connect to and communicate over the networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

FIG. 6 shows an exemplary constitution of a reporting unit as a computer, for example, that can be configured through software to provide the reporting unit 29 illustrated in FIG. 2. As shown in FIG. 6, the reporting unit 600 includes a controller (or central processing unit) 61 that communicates with a number of other components, including memory or storage part 62, network interface 63, display 64 and keyboard 65, by way of a system bus 69.

The reporting unit 600 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In reporting unit 600, the controller 61 executes program code instructions that controls device operations. The controller 61, memory/storage 62, network interface 63, display 64 and keyboard 65 are conventional, and therefore in order to avoid occluding the inventive aspects of this disclosure, such conventional aspects will not be discussed in detail herein.

The reporting unit 600 includes the network interface 63 for communications through a network, such as communications through the network 21 with the core management units 27-1 and 27-2 and network devices 25-1 through 25-8 in FIG. 2. However, it should be appreciated that the subject matter of this disclosure is not limited to such configuration. For example, the reporting unit 600 may communicate with client terminals through direct connections and/or through a network to which some components are not connected. As another example, the reporting unit 600 need not be provided by a server that services terminals, but rather may communicate with the devices on a peer basis, or in another fashion.

Reporting unit 29 is not limited to a server or computer, but can be manifested in any of various devices that can be configured to communicate over a network and/or the Internet.

Moreover, the computer 600 illustrated in FIG. 6 can also be configured through software to provide the core management units 27 and/or data collection units 26 illustrated in FIG. 2, in a manner similar to that described above. Thus, the description above regarding computer 600 being configured as a reporting unit applies similarly to computer 600 being configured as a core management unit and/or data collection unit, and will not be repeated in the interests of clarity.

Each of the network-devices 25-1 through 25-8 and the external device 30 may be any network-connected device including but not limited to a personal, notebook or workstation computer, a terminal, a kiosk, a PDA (personal digital assistant), a tablet computing device, a smartphone, a scanner, a printer, a facsimile machine, a multi-function device (MFD), a server, a mobile phone or handset, another information terminal, etc. Each device may be configured with software allowing the device to communicate through networks with other devices.

The multi-function device (MFD) 25-3 may be any apparatus (including a microprocessor chip or a collection of devices having varying degrees of integration) that has the ability to perform two or more functionalities. The multi-function device 25-3 may be a terminal or any computing device including but not limited to a personal, notebook or workstation computer, a kiosk, a PDA (personal digital assistant), a tablet computing device, a smartphone, a scanner, a printer, a facsimile machine, a server, a mobile phone or handset, another information terminal, etc. The multi-function device 25-3 is configured with software allowing the multi-function device 25-3 to communicate through a network with core management unit 27-1, data collection units 26-1, 26-2, and/or other network devices.

Figure 7:
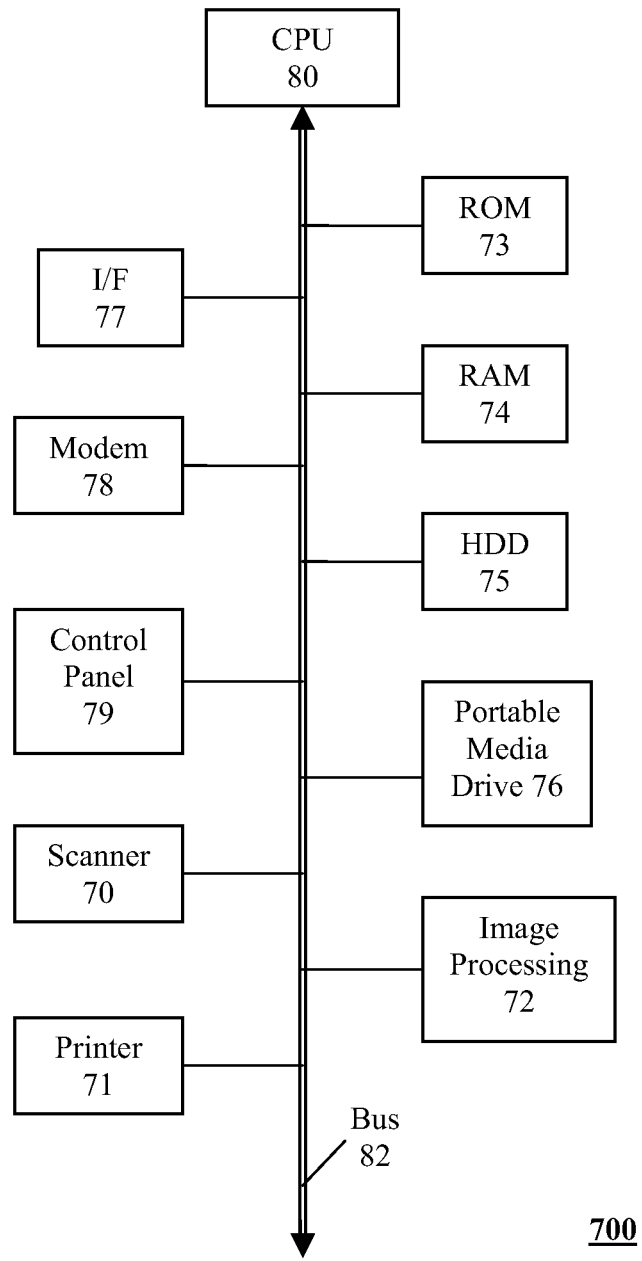
FIG. 7 shows a block diagram of an exemplary configuration of a multi-function device, such as multi-function device 25-3 of FIG. 2.

An example of a configuration of a multi-function device 25-3 is shown schematically in FIG. 7. Device 700 includes a central processing unit (CPU) 80, and various elements connected to the CPU 80 by an internal bus 82. The CPU 80 services multiple tasks while monitoring the state of the device 700. The elements connected to the CPU 80 include a scanner unit 70, a printer unit 71, an image processing device 72, a read only memory (for example, ROM, PROM, EPROM, EEPROM, etc.) 73, a random access memory (RAM) 74, a hard disk drive (HDD) 75, portable media (for example, floppy disk, optical disc, magnetic discs, magneto-optical discs, semiconductor memory cards, etc.) drives 76, a communication interface (I/F) 77, a modem unit 78, and an operation panel 79.

Program code instructions for the device 700 can be stored on the read only memory 73, on the HDD 75, or on portable media and read by the portable media drive 76, transferred to the RAM 74 and executed by the CPU 80 to carry out the instructions. These instructions can include the instructions to the device to perform specified ones of its functions and permit the device 700 to interact with core management unit 27-1, data collection units 26-1, and/or other network devices, and to control the operation panel 79 and the image processing unit 72 of the device 700.

The operation panel 79 includes a display screen that displays information allowing the user of the device 700 to operate the device 700. The display screen can be any of various conventional displays (such as a liquid crystal display, a plasma display device, a cathode ray tube display, etc.), but is preferably equipped with a touch sensitive display (for example, liquid crystal display), and configured to provide the GUI based on information input by an operator of the device, so as to allow the operator to conveniently take advantage of the services provided by the system. The display screen does not need to be integral with, or embedded in, the operation panel 79, but may simply be coupled to the operation panel by either a wire or a wireless connection. The operation panel 79 may include keys for inputting information or requesting various operations. Alternatively, the operation panel 79 and the display screen may be operated by a keyboard, a mouse, a remote control, touching the display screen, voice recognition, or eye-movement tracking, or a combination thereof. The device 700 is a multifunction device (with scanner, printer and image processing) and in addition can be utilized as a terminal to download documents from a network.

Additional aspects or components of the device 800 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 8:
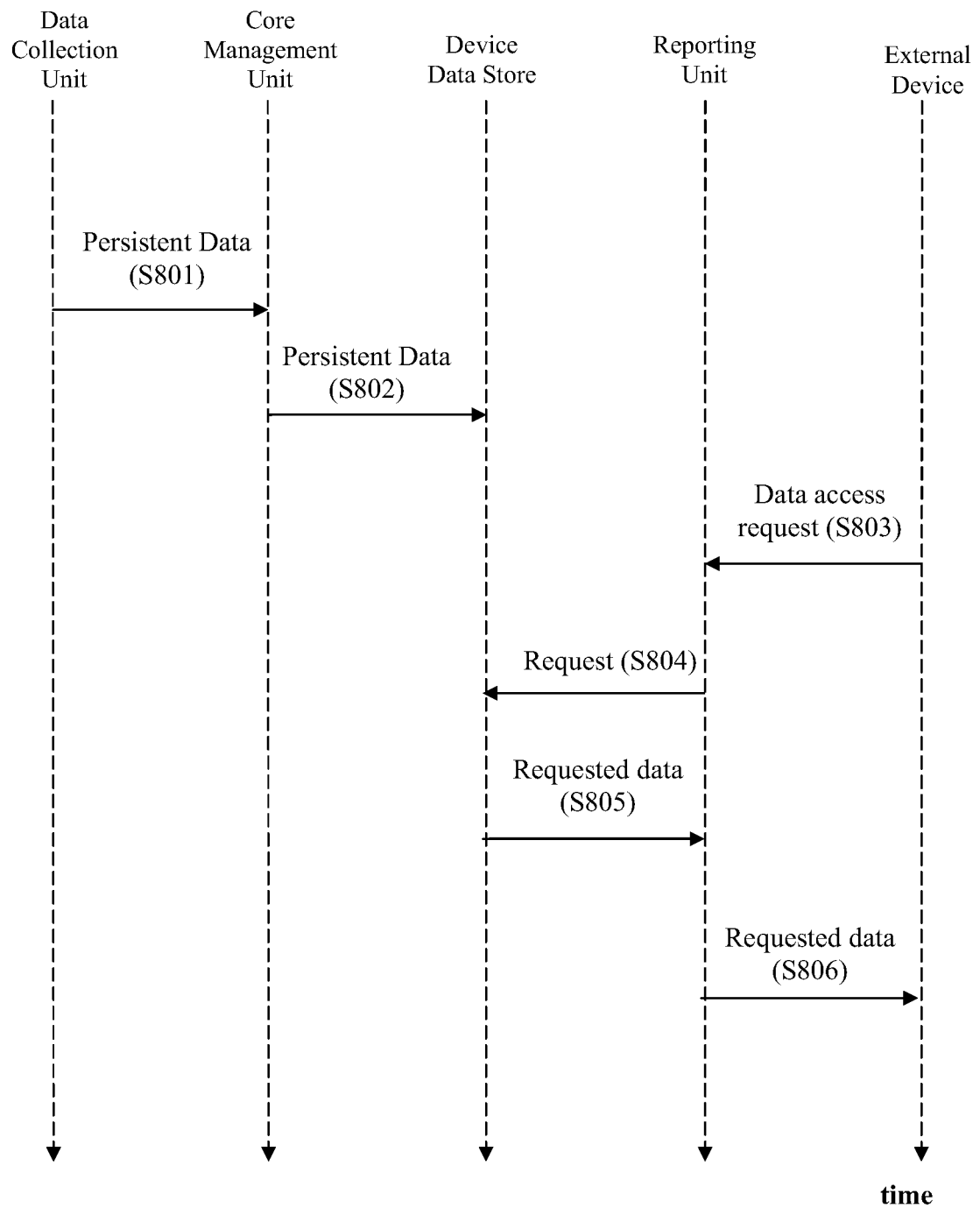
FIG. 8 shows a schematic diagram of a dataflow, in accordance with an exemplary embodiment.

Turning now to FIG. 8, there is shown a schematic diagram of a dataflow in a system, such as system 200 illustrated in FIG. 2, according to an exemplary embodiment.

Firstly, a data collection unit (such as data collection unit 26-1 illustrated in FIG. 2) transmits persistent data to a core management unit (such as core management unit 27-1 illustrated in FIG. 2), in S801. The persistent data may include device data collected by the data collection unit from a plurality of network devices associated with the data collection unit (such as network devices 25-1 and 25-2 associated with data collection unit 26-1). Although not shown in FIG. 8, the core management unit may also receive persistent data from other data collection units. The core management unit then uploads the persistent data received from one or more data collection units to a device data store, such as device data store 28), in S802.

Thereafter, a reporting unit (such as reporting unit 29) receives a data access request from an external device (such as external device 30) in S803. The reporting unit communicates a request to the device data store for the requested data (S804), receives the requested data from the device data store (S805) and provides the requested data received from the device data store to the external device (S806).

Figure 9:
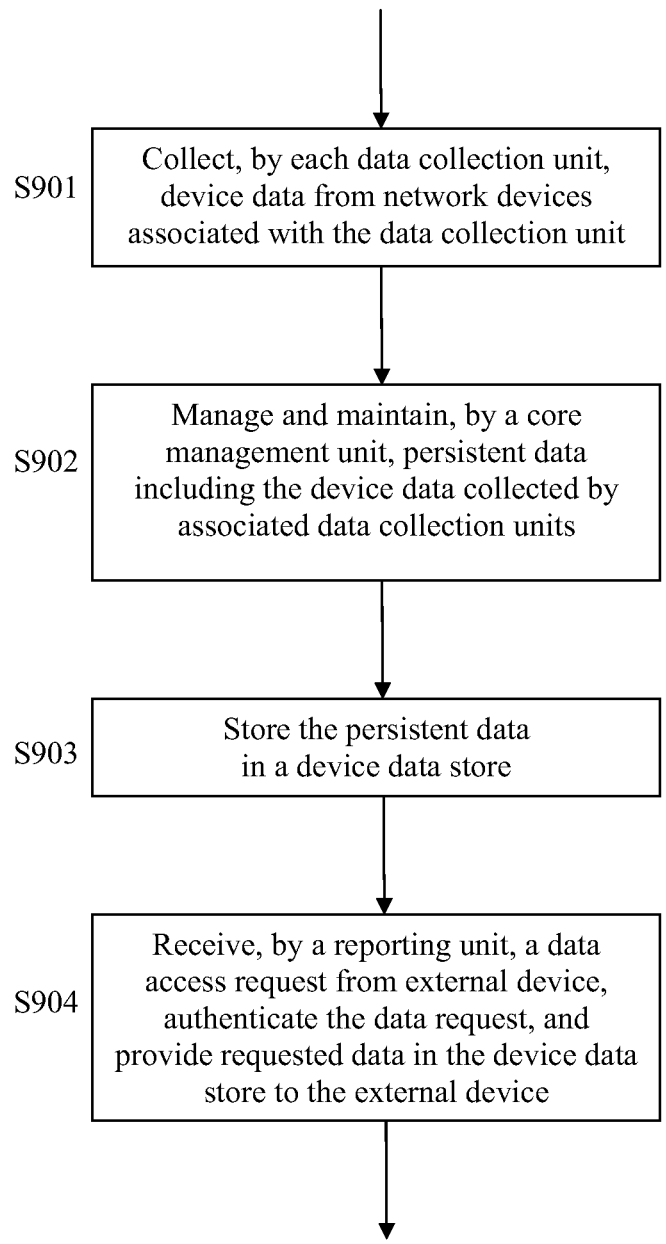
FIG. 9 shows a flowchart of a method performed in a system, such as system 200 illustrated in FIG. 2, according to an exemplary embodiment.

Turning now to FIG. 9, there is shown a flowchart of a method performed in a system such as system 200 of FIG. 2, according to an exemplary embodiment. The method may be performed by a one or more data collection units (such as data collection units 26-1 through 26-4), one or more core management units (such as a core management units 27-1 and 27-2), and a reporting unit (such as reporting unit 29).

In S901, each data collection unit of the one or more data collection units collects device data from a plurality of network devices assigned to that data collection unit. An example of device data collected by a data collection unit 26-1 from a plurality of network devices 25-1 and 25-2 is illustrated in FIG. 3A, and an example of device data collected by a data collection unit 26-2 from a plurality of network devices 25-3 and 25-4 is illustrated in FIG. 3B.

In S902, each core management unit manages and maintains persistent data collected in the network environment, the persistent data including the device data collected by each of the data collection units associated with that core management unit. An example of persistent data managed and maintained by core management unit 27-1, including the device data collected by the associated data collection units 26-1 and 26-2, is illustrated in FIG. 4.

Then in S903, the persistent device data collected by the plural device data collection units and obtained by the one or more core management units is stored in a device data store. An example of persistent device data uploaded to the device data store 28 (by the core management units 27-1 and 27-2) is illustrated in FIG. 5.

Finally in S904, a reporting unit receives a data access request from an external device external to the network environment, authenticates the data access request received from the external device, and upon authentication, provides the requested data from the device data store to the external device, in response to the data access request received from the external device. (See FIG. 8, for example).

The flowchart illustrated in FIG. 9 illustrates a method performed by one or more core management units, one or more data collection units and a reporting unit. However, it should be understood that any one of the data collection units, core management units or reporting unit may independently perform methods comprising one or more of the steps illustrated in FIG. 9.

Figure 10A:
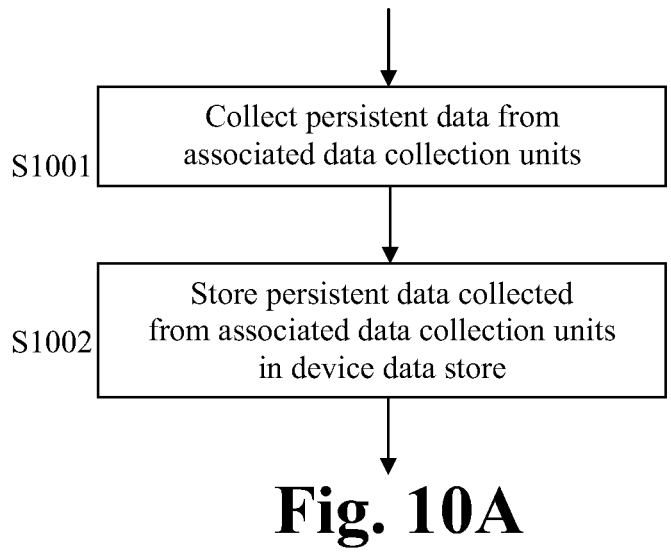
FIG. 10A shows a flowchart of a method performed by a core management unit, such as core management unit 27-1 illustrated in FIG. 2, according to an exemplary embodiment.

For example, FIG. 10A illustrates a flowchart of a method performed by a core management unit, such as core management unit 27-1 or 27-2 illustrated in FIG. 2, according to an exemplary embodiment. In S1001, the core management unit manages and maintains persistent data collected in the network environment, the persistent data including the device data collected by each of the data collection units associated with that core management unit. An example of persistent data managed and maintained by core management unit 27-1, including the device data collected by the associated data collection units 26-1 and 26-2, is illustrated in FIG. 4. Then in S1002, the persistent device data collected by the plural device data collection units and obtained by the one or more core management units is stored in a device data store. An example of persistent device data uploaded to the device data store 28 (by the core management units 27-1 and 27-2) is illustrated in FIG. 5.

Figure 10B:
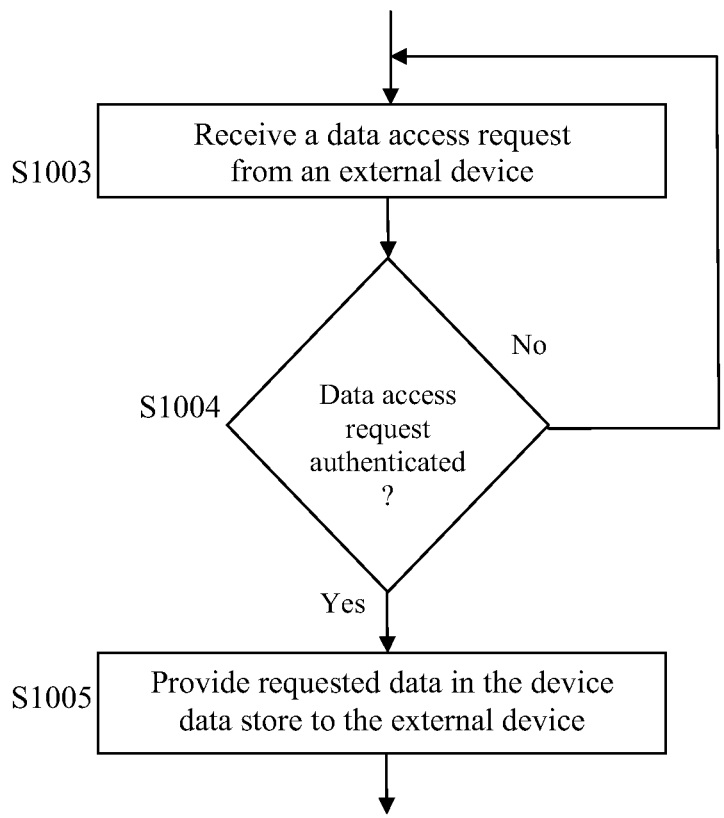
FIG. 10B shows a flowchart of a method performed by a reporting unit, such as reporting unit 29 illustrated in FIG. 2, according to an exemplary embodiment.

As another example, FIG. 10B illustrates a flowchart of a method performed by a reporting unit, such as reporting unit 29 illustrated in FIG. 2, according to an exemplary embodiment. In S1003, the reporting unit receives a data access request from an external device, such as external device 30 illustrated in FIG. 2. In S1004, the reporting unit determines whether the data access request is authenticated (or, alternatively, whether the external device itself or a user of the external device is authenticated). If the authentication is successful (S1004, Yes), then the reporting unit obtains the data requested in the data access request from the device data store (such as device data store 28 illustrated in FIG. 2), and provides this data to the external device in S1005. If the authentication is not successful (S1004, No), the workflow returns to S1003.

Figure 11:
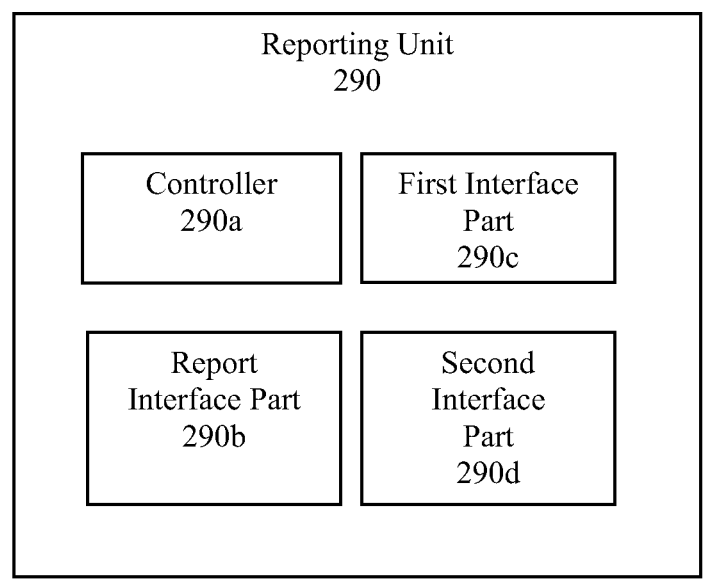
FIG. 11 illustrates an example of a more detailed configuration of a reporting unit, such as reporting unit 29 depicted in FIG. 2, according to another exemplary embodiment.

Turning now to FIG. 11, there is described a reporting unit 290 (which may be used to implement reporting unit 29 illustrated in FIG. 2) in greater detail. The reporting unit 290 includes a controller 290*a*, a report interface part 290*b*, a first interface part 290*c* and a second interface part 290*d*. The controller 290*a* is configured to control the operations of the reporting unit 290 and the constituent components of the reporting unit such as the report interface part 290b, first interface part 290c and second interface part 290d, so that the parts perform the functionalities described below.

The report interface part 290b is configured to connect and communicate with an external device, such as external device 30 illustrated in FIG. 2. In particular, the report interface part is configured to receive a data access request from an external device external to the network environment, authenticate the data access request from the external device, and upon authentication, provide requested data in the device data store to the external device, in response to the data access request from the external device.

The report interface part 290b may be configured to generate and provide one or more user interface screens, which may be transmitted through a network and accessible on a display unit of the external device via a network, such as the network 31 illustrated in FIG. 2 (which may be, for example, the internet). The user interface screens may be configured to receive, from the external device, a user specification of a data access request.

Figure 12:
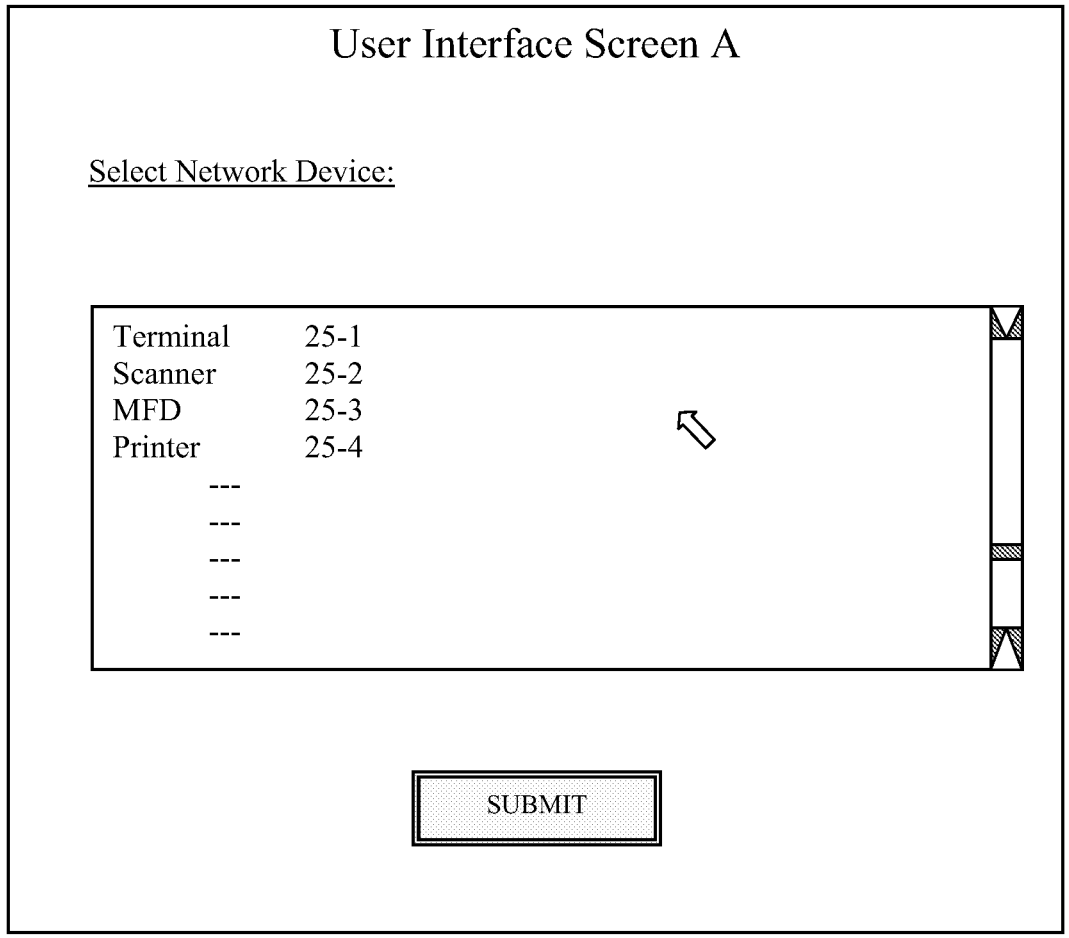

For example, the report interface part 290b may display the user interface screen A illustrated in FIG. 12, which is configured to receive user selection of a network device, such as one of network devices 25-1 through 25-8. This selection of a network device may correspond to a data access request, i.e. a request for all device data corresponding to that network device. As another example, the report interface part 290b may display the user interface screen B illustrated in FIG. 13, which is configured to receive user selection of a network device, such as one of network devices 25-1 through 25-8 (e.g. "Printer 25-4") via, for example, a pull-down selection menu. Moreover, the user interface screen B illustrated in FIG. 13 may be configured to receive user selection of one or more types of device data, such as "IP address", "Device Status", "Usage History", "Consumables Level" and so forth. This selection of a network device and various types of device data may correspond to a data access request, i.e. a request for all device data corresponding to that network device and having the selected type.

The report interface part 290b may include hardware and/or software configured to display a graphical user interfaces (GUI) and/or an object-oriented user interface on a display part (such as a monitor, display screen, etc.) of the reporting unit 290, network-connected client terminal or external device. The report interface part 290b accepts inputs via a network or via an input part (such as a keyboard, mouse, touchscreen, etc.) of the reporting unit 290, network-connected client terminal or external device. As one example, the report interface part 290b may include a Web-based user interface or web user interface (WUI) that generates web pages which are transmitted via the network 31 or the Internet and viewed by the user using a web browser program on the external device 30 or a client terminal connected to the network 31. The report interface part 290b may be implemented utilizing software programs and/or languages such as Java, AJAX, Adobe Flex, Microsoft .NET, or similar technologies.

The report interface part 290b may communicate with the device data store 28 in order to obtain the device data requested in the data access request received from the external device. For example, if the data access request requests all data from the MFD 25-3, then the report interface part 290b may transmit a request to the device data store 28 via a network for all the device data corresponding to the MFD 25-3. If the persistent device data is stored in the device data store in a relational database and/or table in the manner illustrated in FIG. 5, then the device data store may extract the device data corresponding to MFD 25-3, and provide this data back to the report interface part 290b. The report interface part 290b may then transmit this data back to the external device as a report. An example of such a report is illustrated in FIG. 14.

Figure 15:

According to another embodiment, the report interface part 290b is configured to provide a user interface to the external device to allow a user at the external device to modify a configuration of a network device. For example, the user interface screen A (FIG. 12) may be provided to the external device 30 to allow a user of the external device to select a network device. Thereafter, the report interface part 290b may display a user interface screen to allow the user of the external device to specify some configuration change to the external device. For example, the user interface screen C illustrated in FIG. 15 may be provided to the external device to allow a user of the external device to specify some configuration change to the external device, such as, for example, changing the assigned device name, assigned device IP Address, assigned device location, assigned device user, firmware version, installed application and so forth.

Thereafter, the first interface part 290c operates to connect and communicate with any specified core management unit, such as any specified one of the core management units 27-1 and 27-2, to modify a configuration of the specified network device. In particular, the controller 290a or other part of the reporting unit 290 may determine the specific core management unit associated with the specified network device. For example, the reporting unit 290 may store system configuration information, such as that illustrated in FIG. 16, which identifies which core management units 27-1 and 27-2 are associated with specific network devices. The first interface part 290c then communicates with the corresponding core management unit associated with the specified network device, and instructs the core management unit to change the configuration of the specified network device. (For example, the core management unit may store the necessary firmware, applications and other executable code that may be transferred to the corresponding network device to be executed by a processor of the corresponding network device). Alternatively, the reporting unit may communicate directly with the network device to change the configuration of the network device.

Figure 17:
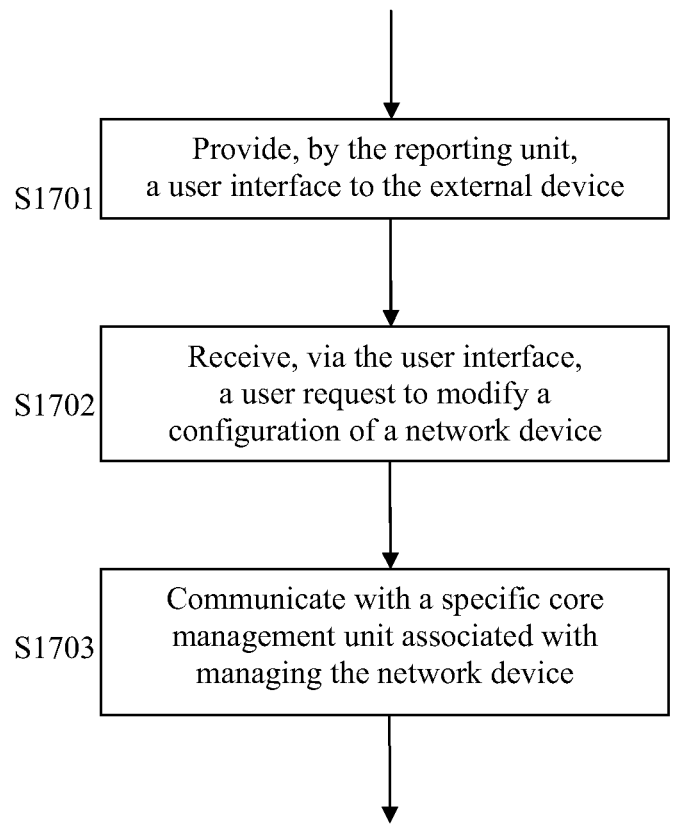
FIGS. 17-19 show flowcharts of methods performed by a reporting unit, such as reporting unit 290 illustrated in FIG. 11, according to exemplary embodiments.

In FIG. 17, there is shown a flowchart of a method performed by a reporting unit, such as reporting 290 illustrated in FIG. 11, according to an exemplary embodiment.

In S1701, the reporting unit provides a user interface to the external device. In S1702, the reporting unit receives, via the user interface provided in S1701, a user request to modify a configuration of a network device (see FIG. 15, for example). In S1703, the reporting unit communicates with a specific core management unit associated with managing the network device, and instructs the specific core management unit to modify the configuration of the network device, based on the user request received in S1702.

According to another embodiment, the report interface part 290b is configured to provide a user interface to the external device to allow a user at the external device to select a network device and obtain device data such as device status information from the selected network device. For example, the user interface screen A (FIG. 12) may be provided to the external device 30 to allow a user of the external device to select a network device. Thereafter, the second interface part 290d operates to connect and communicate with the user-selected network device, such as network devices 25-1 through 25-8, to obtain device status information from the selected network device. For example, if the user selects the network device MFD 25-3, then the second interface part 290d operates to connect and communicate with the MFD 25-3 to obtain device status information from the MFD 25-3. The report interface part 290*b* may then provide the received device data such as device status information to the user of the external device 30 via a user interface screen, such as the user interface screen illustrated in FIG. 14.

Figure 18:
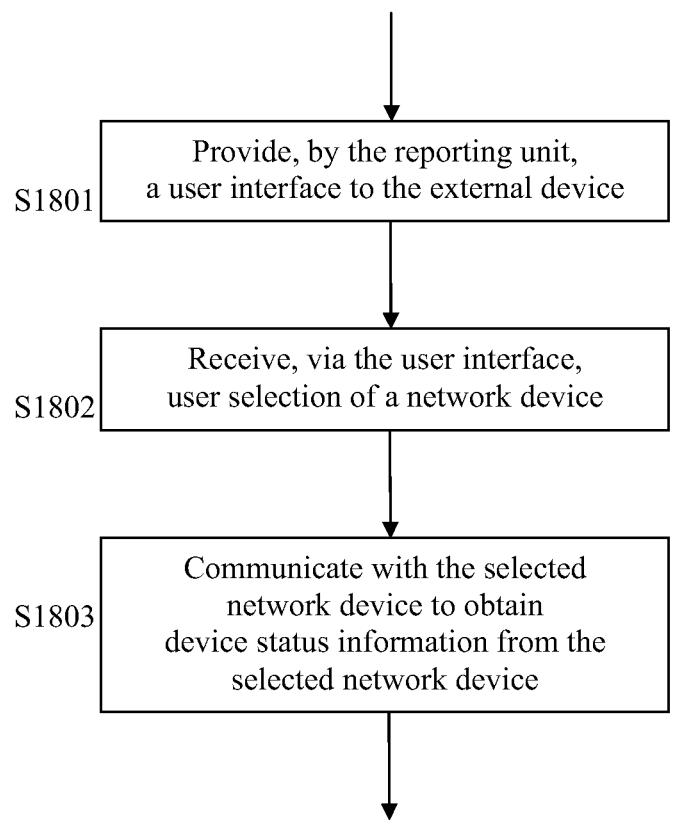

In FIG. 18, there is shown a flowchart of a method performed by a reporting unit, such as reporting 290 illustrated in FIG. 11, according to an exemplary embodiment.

In S1801, the reporting unit provides a user interface to the external device (see FIG. 12, for example). In S1802, the reporting unit receives, via the user interface, user selection of a network device. In S1803, the reporting unit communicates with the selected network device to obtain device data such as status information from the selected network device. The reporting unit may provide this device data to the external device via a user interface screen (see FIG. 14, for example).

According to another embodiment, the report interface part 290*b* is configured to provide a user interface to the external device to allow a user at the external device to specify device data upload criteria. For example, the user interface screen B (FIG. 13) may be provided to the external device 30 to allow a user of the external device to specify device data upload criteria. As used herein, device data upload criteria refers to the type of information that the core management units upload to the device data store. Alternatively, the device data upload criteria may refer to the type of information that the reporting unit 200 is permitted to access from the device data store, or to the format of the report transmitted from the reporting unit 200 to the external device 30.

Figure 13:
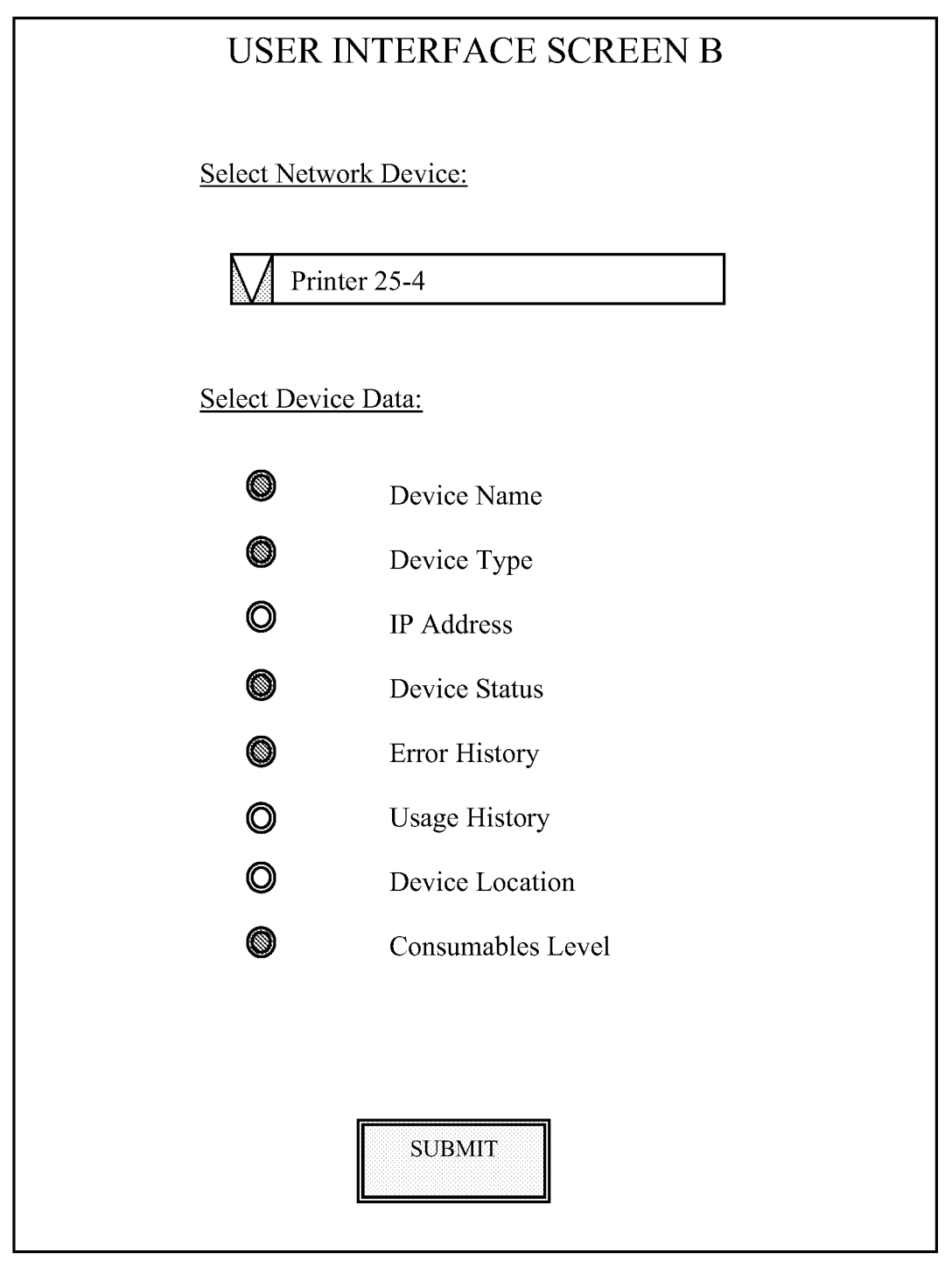

The first interface part 290*c* operates to connect and communicate with a core management unit, such as core management units 27-1 and 27-2, and communicate the specified device data upload criteria to one or more of the core management units. For example, if the user specifies the network device Printer 25-4 (via the user interface screen B of FIG. 13, for example) then the controller 290*a* or other part of the reporting unit 290 may determine that the specific core management unit 27-1 is associated with the specified network device Printer 25-4. (For example, the reporting unit 290 may store system configuration information, such as that illustrated in FIG. 16, which identifies which core management units 27-1 and 27-2 are associated with specific network devices). The first interface part 290*c* then communicates with the corresponding core management unit associated with the specified network device, and communicates the specified device data upload criteria to the core management unit. In this way, the core management unit is instructed to only upload device data to the device data store that is in agreement with the specified device data upload criteria. In the example of FIG. 13, the core management unit 27-1 will be instructed to only upload, for the network device Printer 25-4, the following types of device data to the device data store 28: device name, device type, device status, error history and consumables level.

Figure 19:
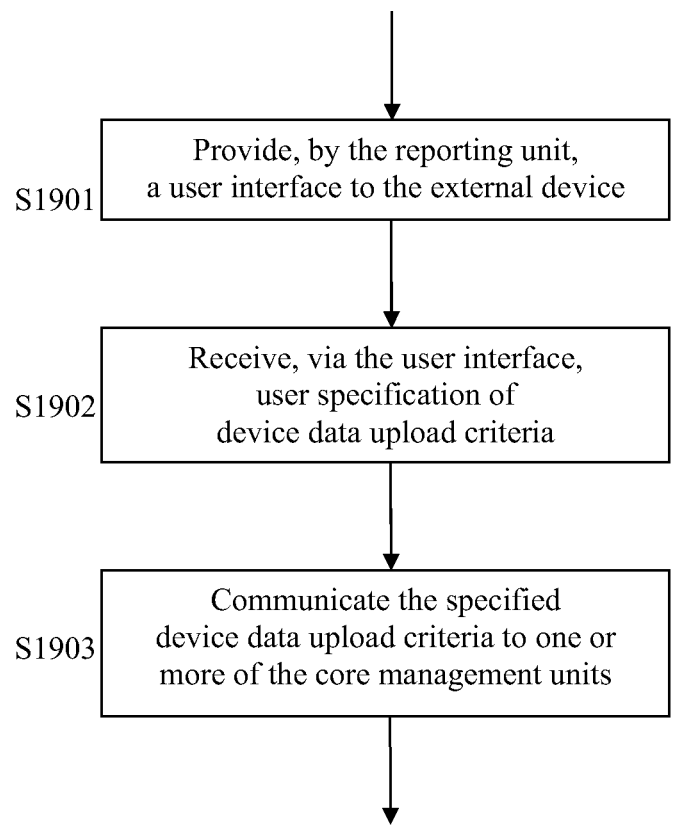

In FIG. 19, there is shown a flowchart of a method performed by a reporting unit, such as reporting 290 illustrated in FIG. 11, according to an exemplary embodiment.

In S1901, the reporting unit provides a user interface to the external device, and in S1902, the reporting unit receives, via the user interface provided in S1901, a user specification of device data upload criteria (see FIG. 13, for example). In S1903, the reporting unit communicates the specified device data upload criteria to one or more of the core management units.

According to one or more of the embodiments described above, one or more of the core management units 27-1 and 27-2 upload device data to the device data store 28. The core management units may upload the device data to the device data store 28 at regular intervals of time, such once every minute, once every hour, once every day, once every week, etc. To aid in this process, each of the core management units 27-1 and 27-2 may keep track of and record an upload time indicating every time an upload has taken place. Further, a core management unit may track a last upload time device data was uploaded, and when the core management unit next uploads data to the device data store at a current upload time, the core management unit only uploads device data collected from the data collection units 26-1 through 26-4 from the last upload time through the current upload time. The core management unit may delete locally stored device data after it is uploaded to the device data store. Moreover, after a core management unit uploads collected device data to the device data store 28, the core management unit may then communicate a notification to the reporting unit 29 to notify the reporting unit that the collected device data has been uploaded to the device data store 28.

Figure 20:
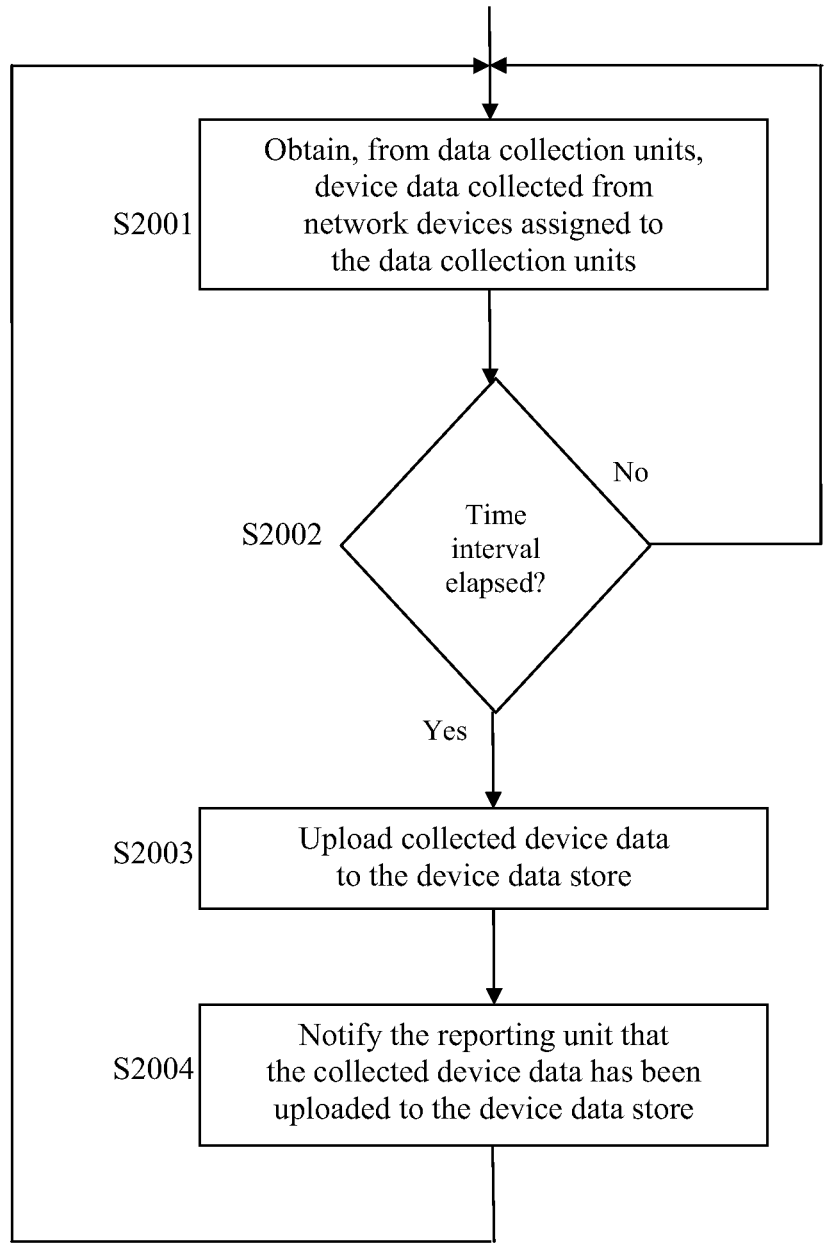
FIG. 20 shows a flowchart of a method performed by a core management unit, such as core management units 27-1 and 27-2 illustrated in FIG. 2, according to an exemplary embodiment.

In FIG. 20, there is shown a flowchart of a method performed by a core management unit, such as core management units 27-1 and 27-2 illustrated in FIG. 2, according to an exemplary embodiment.

In S2001, the reporting unit obtains, from data collection units associated with the core management unit, device data collected from the network devices assigned to the data collection units. In S2002, the reporting unit may determine a whether a predetermined time interval has elapsed since device data was last uploaded to the device data store. If the reporting unit determines that the predetermined interval has elapsed (S2002, Yes), then the reporting unit uploads the collected device data to the device data store in S2003. (The reporting unit may upload only device data collected by the data collection units from the network devices from a last upload time through the current upload time. Instead or in addition, the reporting unit may upload only device data obtained by the core management unit from the data collection units from a last upload time through the current upload time). The reporting unit then notifies the reporting unit that the collected device data has been uploaded to the device data store in S2004, and the workflow returns to S2001. If the reporting unit determines that the predetermined interval has not elapsed (S2002, No), then the workflow returns to S2001.

According to one or more of the embodiments described above, the reporting unit 29 authenticates the data request, external device 30 and/or a user of the external device 30. The reporting unit 29 may do so by receiving authentication information such as a code, password, key, etc., from the external device 30, and comparing the received authentication information with a series of predetermined authentication codes, passwords, keys, etc., stored at the reporting unit 29. The authentication information may be any information transmitted to the reporting unit 29 for the purposes of login and authentication, such as usernames, passwords, email addresses, screen names, telephone numbers, facsimile numbers, and biometric information (fingerprints, palm prints, voice or speech, retinas or irises, facial expressions or features, signature, etc.).

Further, if the reporting unit 29 authenticates the data request, external device 30 and/or a user of the external device 30, the authentication unit may transmit an authentication token to the external device, wherein the token has an associated period of time after which the token expires. That is, any data access requests from the external device 30 must include the authentication token, and the authentication token expires if not used within a defined usage period.

Moreover, if the reporting unit 29 authenticates a user operating the external device 30, the reporting unit may determine a scope of data to be accessible to the authenticated user, and limit data access by the user to said scope. For example, if the reporting unit determines that the user is a first user entitled to access all information, then the reporting unit will provide any device data from the device data store 28 to the external device 30 that is requested in an access data request. On the other hand, if the reporting unit determines that the user is a second user entitled to access only certain information (such as device data from Printer 25-4), than the reporting unit will only provide device data from the device data store 28 to the external device 30 that corresponds to that certain information (such as device data from Printer 25-4). To aid in this process, the reporting unit 29 may store an access control list, such as that illustrated in FIG. 21.

Figure 22A:
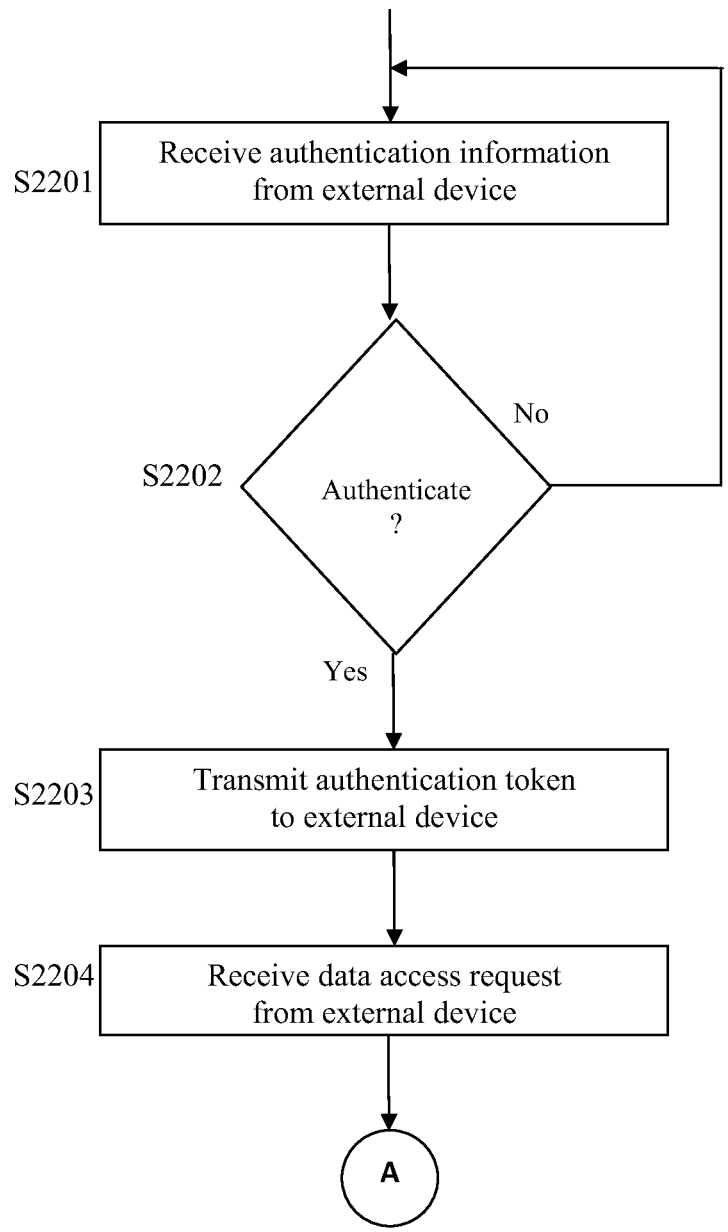
FIGS. 22A and 22B show a flowchart of a method performed by a reporting unit, such as reporting unit 29 illustrated in FIG. 2, according to an exemplary embodiment.
Figure 22B:
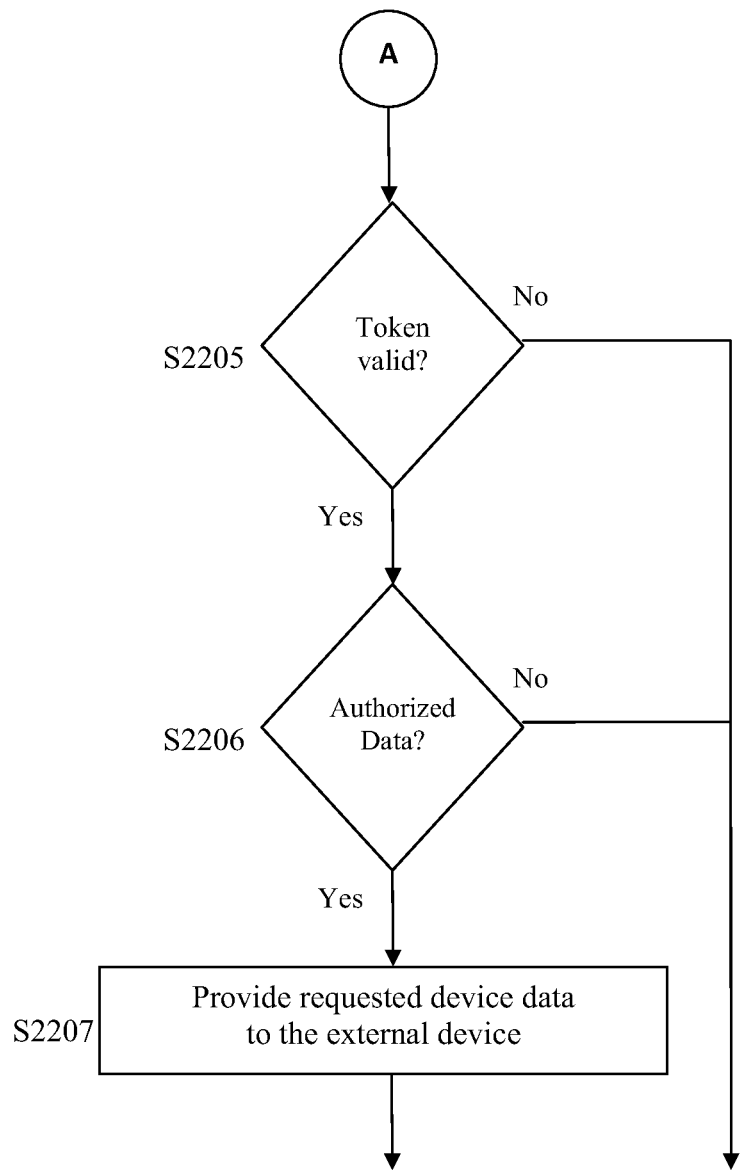

In FIGS. 22A and 22B, there is shown a flowchart of a method performed by a reporting unit, such as reporting unit 29 illustrated in FIG. 2, according to an exemplary embodiment.

In S2201, the reporting unit receives authentication information from an external device. In S2202, the reporting unit determines whether the external device is authenticated based on the authentication information received in S2201. If the external device is not authenticated (S2202, No), then the workflow returns to S2201. If the external device is authenticated (S2202, Yes), then reporting unit transmits an authentication token to the external device in S2203, the token having an associated period of time after which the token expires.

Thereafter, in S2204, the reporting unit receives a data access request from the external device. If the reporting unit determines that the token is valid, i.e. that the period of time associated with the token has not expired (S2205, Yes), and if the reporting unit also determines that the data requested in the data access request is authorized for the user of the external device (S2206, Yes), then the reporting unit provides the requested device data to the external device in S2207 and the workflow ends. On the other hand, if the reporting unit determines that the token is not valid, i.e. that the period of time associated with the token has expired (S2205, No), or the reporting unit determines that the data requested in the data access request is not authorized for the user of the external device (S2206, No), then the workflow ends.

While the example shown in FIG. 2 includes one reporting unit 29, one device data store 28, two core management units, four data collection units, and eight network devices, it should be appreciated that such numbers of units, devices, terminals and apparatuses are arbitrary and are selected as an example in order to facilitate discussion, and that the subject matter of this disclosure can be implemented in a system including one or more systems, servers, units, apparatuses and terminals. The functions of some of the devices may be combined, and other devices such as scanners, printers and multi-function devices may also be connected to a network, as is well known in the art. Further, the reporting unit, device data store, core management unit, data collection units and network devices may be connected in a different network arrangement to that depicted in FIG. 2.

Figure 23A:
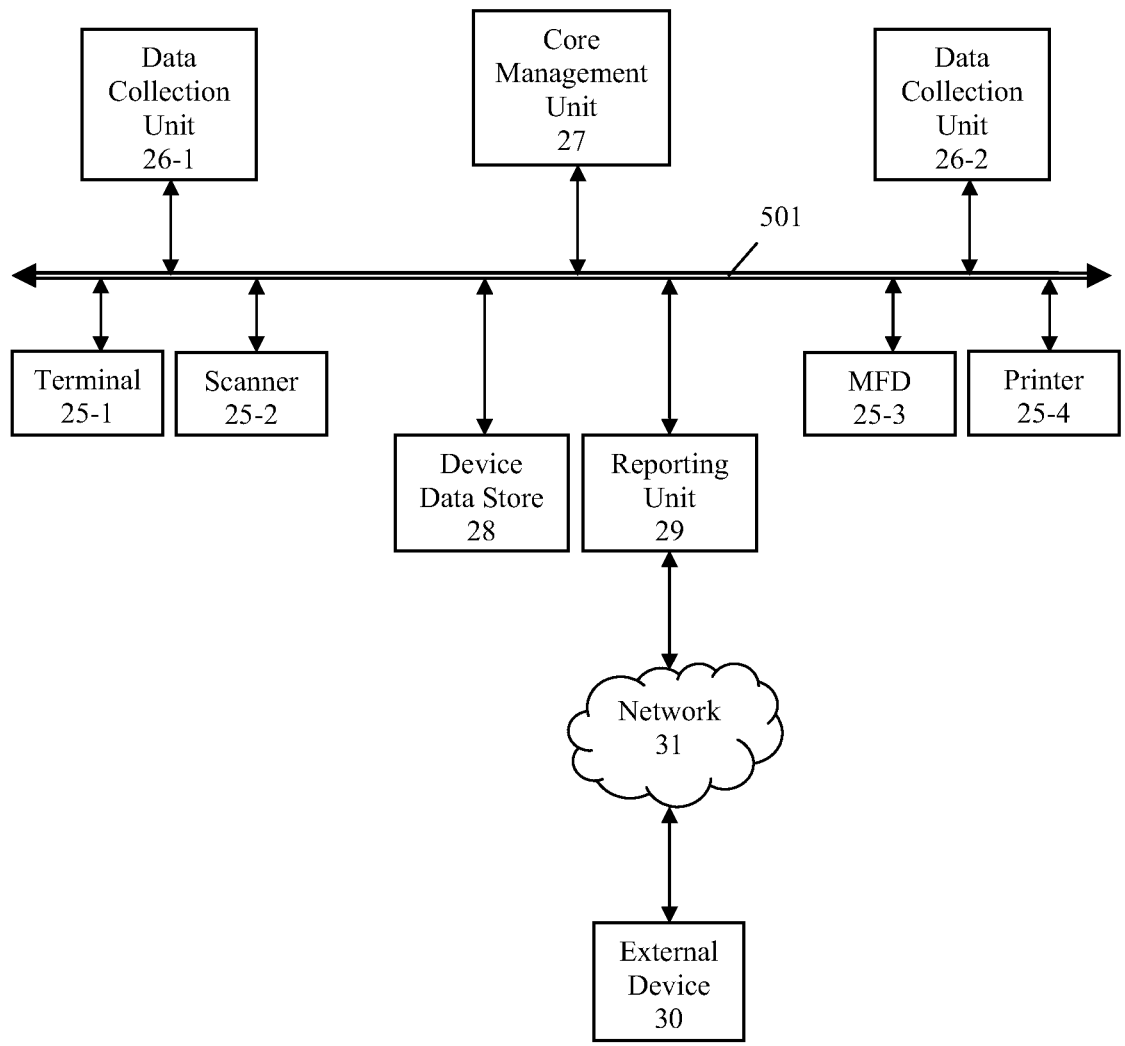
FIGS. 23A and 23B show block diagrams of systems, according to other exemplary embodiments.

For example, FIG. 23A shows schematically a system 2300-A for managing a plurality of devices connected to one or more networks, according to an exemplary embodiment. System 2300-A is similar to system 200 illustrated in FIG. 2, except that only one core management unit 27, two data collection units 26-1 and 26-2, and four network devices 25-1 through 25-4 are provided. The core management unit 27, data collection units 26-1-26-2, network devices 25-1 through 25-4, device data store 28 and reporting unit 29 are interconnected via a single network 501. The aforementioned devices may function in a substantially similar manner as the devices illustrated in FIG. 2, and in accordance with one or more of the described aspects and embodiments of this disclosure.

Figure 23B:
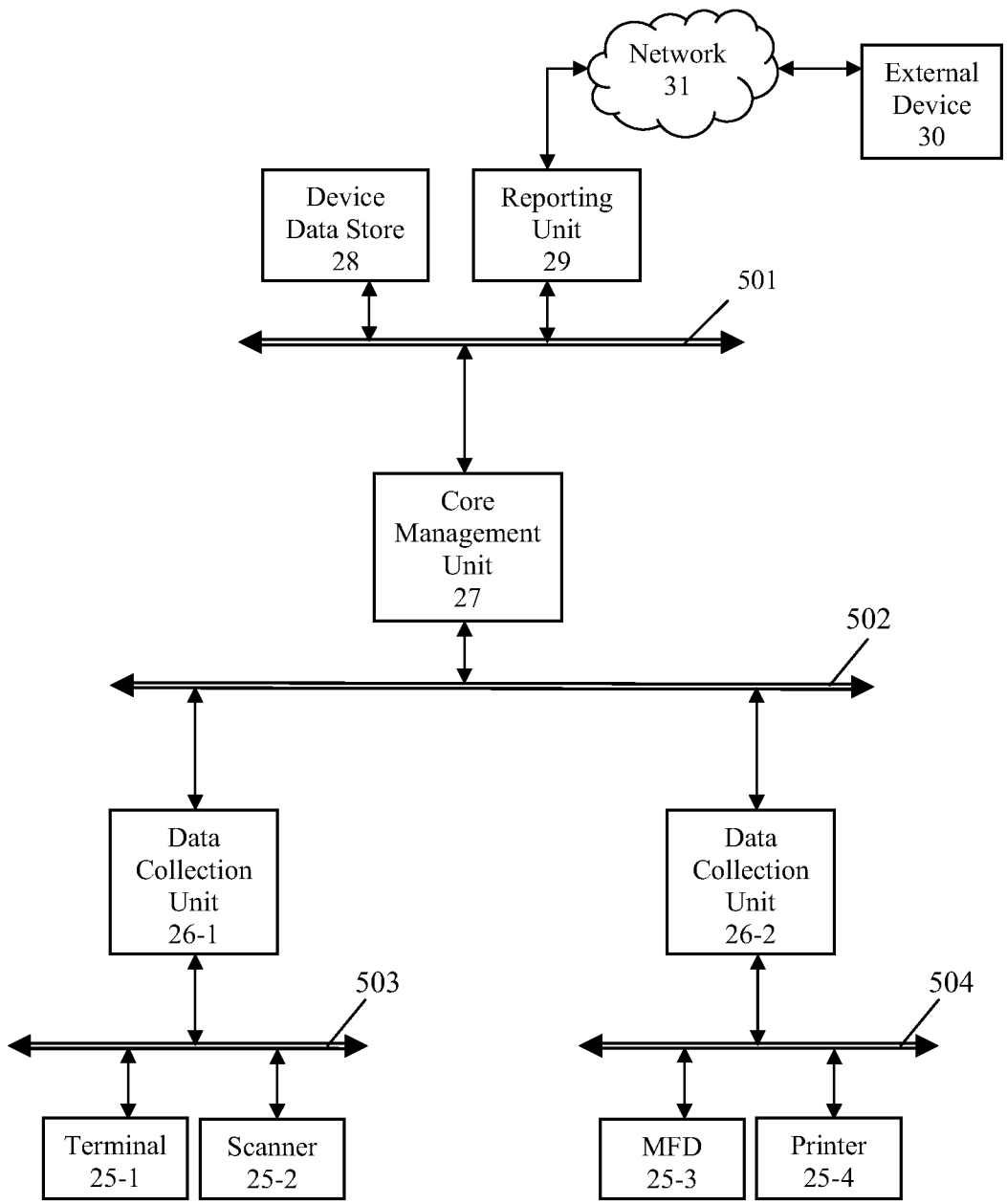

As another example, FIG. 23B shows schematically a system 2300-B for managing a plurality of devices connected to one or more networks, according to another exemplary embodiment. System 2300-B includes a plurality of network devices (i.e. network-connected devices) 25-1 through 25-4, one or more data collection units 26-1 and 26-2, a core management unit 27, device data store 28 and reporting unit 29. The aforementioned devices may function in a substantially similar manner as the devices illustrated in FIG. 2, and in accordance with one or more of the described aspects and embodiments of this disclosure. While the data collection unit 26-1 and network devices 25-1 and 25-2 are interconnected via a network 503, the data collection unit 26-2 and network devices 25-3 and 25-4 are interconnected via another network 504. Moreover, the data collection units 26-1 and 26-2 are interconnected with the core management unit 27 via another network 502. Further, the core management unit 27, device data store 28 and reporting unit 29 are interconnected via yet another network 501.

In the systems illustrated in FIGS. 2 and 23, the data collection units may poll the network devices 25-1 through 25-8 and communicate with the network devices 25-1 through 25-8 using a first network communication protocol, such as SNMP, in order to obtain the device data from the network devices. Thereafter, the data collection units may convert the device data into data having another format (such as HTTP) for transmission to the core management unit 27, device data store 28, reporting unit 29, another network-connected device, a "cloud" server system, and so forth. The core management unit 27 may communicate with the data collection units 26-1 and 26-2 through a particular network communication protocol, such as HTTP via the internet.

Although the network devices 25-1 through 25-8 depicted in FIG. 2 are shown as being connected to the networks 21 and 23, the aspects of this disclosure may be applied to a system for managing a device that is not connected to a network. For example, aspects of this disclosure may be applied to a system for managing a device with use of radio-frequency identification (RFID) technology.

Figure 24:
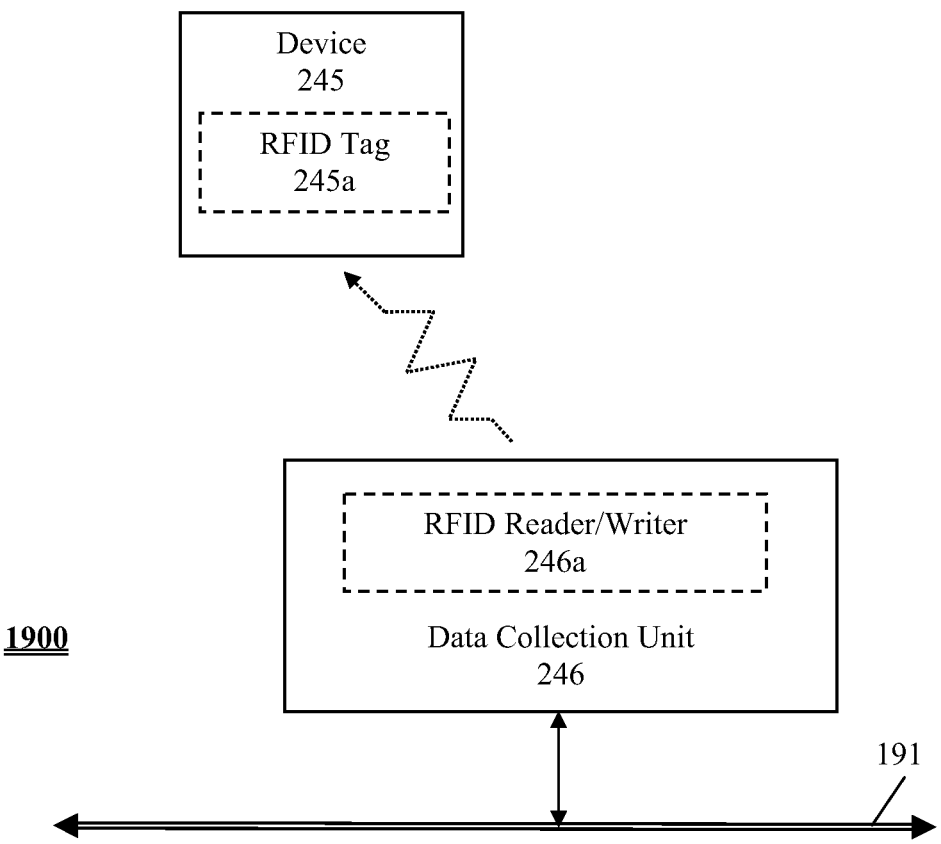
FIG. 24 shows a block diagram of a system, according to another exemplary embodiment.

FIG. 24 depicts an example of a system 2400 according to another exemplary embodiment. The system 2400 includes a data collection unit 246, which may be similar to the data collection units 26-1 through 26-4 depicted in FIG. 2, except that the data collection unit 246 also includes an RFID Reader/Writer 246a. The system 2400 further includes a device 245 which is an IT asset that is not network-connected, (i.e. a standalone device with no network interface), which may be an electronic stapler, shredder, etc. The device 245 may include an RFID tag 245a physically incorporated into the device 245, or in some way attached to the device 245. In this way, the RFID reader/writer 246a of the data collection unit 246 may communicate with the RFID tag 245a of the device 245, in order to obtain device data from the device 245 or communicate with the device 245, according to the exemplary embodiments of this disclosure described above. Aspects of RFID technology, including the ability for RFID reader/writer devices to communicate with RFID tags, are understood in the art and will not be described in detail in this disclosure.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A system for reporting device management information in a network environment, said system comprising:
    plural device data collection units, each device data collection unit amongst the plural device data collection units collecting device data from a corresponding plurality of network devices associated with the device data collection unit;
    one or more core management units, each core management unit of the core management units being associated with a corresponding group of collection units from amongst the plural device data collection units, and the core management unit communicating with the group of associated collection units to manage and maintain persistent device data collected from the associated collection units;
    a device data store that stores the persistent device data collected from the plural device data collection units; and
    a reporting unit including a report interface part to provide a user interface to another device to receive device parameter criteria, input by a user of said another device, to specify types of device data to be collected from the plurality of network devices and to be uploaded to the device data store and cause the one or more core management units to upload device data of the types corresponding to the specified device parameter criteria to the device data store,
    wherein the report interface part operates to receive a data access request from an external device external to the network environment, authenticate the data access request from the external device, and upon authentication, provide requested data in the device data store to the external device, in response to the data access request from the external device,
    wherein the requested data provided by the reporting unit in response to the data access request from the external device includes information indicating whether an error or problem exists or has occurred at one or more of the network devices and information regarding the properties of the device.

2. The system of claim 1, wherein the reporting unit includes a first interface part that operates to connect and communicate with any specified one of the core management units, and a second interface part that operates to connect and communicate with any specified one of the network devices.

3. The system of claim 2, wherein the report interface part provides a user interface to the external device to allow a user at the external device to modify a configuration of a network device, and the reporting unit communicates through the first interface parts with a specific core management unit associated with managing the network device.

4. The system of claim 2, wherein the report interface part provides a user interface to the external device to allow a user at the external device to select a network device, and the reporting unit communicates through the second interface parts with the selected network device to obtain device status information from the selected network device.

5. The system of claim 1, wherein the core management unit tracks a last upload time device data was uploaded, and uploads to the device data store, at a current upload time, collected device data from the last upload time through the current upload time.

6. The system of claim 1, wherein the core management unit uploads collected device data to the device data store, and then communicates a notification to the reporting unit to notify the reporting unit that the collected device data has been uploaded to the device data store.

7. The system of claim 1, wherein the core management unit, for each network device from which device data is collected by a corresponding collection unit in the group of associated collection units associated with the core management unit, uploads at a regular interval of time to the device data store the device data collected from the network device by the collection unit from a last upload time through a current upload time.

8. The system of claim 1, wherein when the report interface part authenticates the external device, the report interface part transmits an authentication token to the external device, and wherein the token has an associated period of time after which the token expires.

9. The system of claim 8, wherein the token transmitted to the external device expires if not used within a defined usage period.

10. The system of claim 1, wherein when the report interface part authenticates a user operating the external device, and upon authentication of the user, determines a scope of data to be accessible to the authenticated user, and limits data access by the user to said scope.

11. A method for a device reporting system for reporting device management information in a network environment said method comprising:
    collecting, by each device data collection unit amongst plural device data collection units of the device reporting system, device data from a plurality of network devices associated with the device data collection unit;
    communicating, by each core management unit of one or more core management units of the device reporting system, a corresponding group of collection units associated with the core management unit, from amongst the plural device data collection units, to manage and maintain persistent device data collected from the associated collection units;
    storing by a device data store the persistent device data collected from the plural device data collection units;
    providing a user interface by a reporting unit to another device to receive device parameter criteria, input by a user of said another device to specify types of device data to be collected from the plurality of network devices and to be uploaded to the device data store and causing the one or more core management units to upload device data of the types corresponding to the specified device parameter criteria to the device data store; and
    receiving by the reporting unit a data access request from an external device external to the network environment, authenticating the data access request from the external device, and upon authentication, providing requested data in the device data store to the external device, in response to the data access request from the external device,
    wherein the requested data provided in response to the data access request from the external device includes information indicating whether an error or problem exists or has occurred at one or more of the network devices and information regarding the properties of the device.

12. The method of claim 11, further comprising:
providing, by the reporting unit, a user interface to the external device;
receiving, via the user interface, a user request to modify a configuration of a network device; and
communicating with a specific core management unit associated with managing the network device.

13. The method of claim 11, further comprising:
providing, by the reporting unit, a user interface to the external device;
receiving, via the user interface, user selection of a network device; and
communicating with the selected network device to obtain device status information from the selected network device.

14. The method of claim 11, further comprising:
tracking a last upload time device data was uploaded, and uploading to the device data store, at a current upload time, collected device data from the last upload time through the current upload time.

15. The method of claim 11, further comprising:
uploading collected device data to the device data store, and then communicating a notification to the reporting unit to notify the reporting unit that the collected device data has been uploaded to the device data store.

16. The method of claim 11, further comprising:
uploading at a regular interval of time to the device data store the device data collected from a network device by a collection unit from a last upload time through a current upload time.

17. The method of claim 11, further comprising:
authenticating the external device, and transmitting an authentication token to the external device, wherein the token has an associated period of time after which the token expires.

18. The method of claim 11, further comprising:
authenticating a user operating the external device, and upon authentication of the user, determining a scope of data to be accessible to the authenticated user, and limiting data access by the user to said scope.

* * * * *